US012685927B2

(12) United States Patent
Numata et al.

(10) Patent No.: US 12,685,927 B2
(45) Date of Patent: Jul. 21, 2026

(54) CONTROLLER

(71) Applicant: Alps Alpine Co., Ltd., Tokyo (JP)

(72) Inventors: Tetsu Numata, Miyagi (JP); Tetsuo Muranaka, Miyagi (JP); Masaki Ota, Miyagi (JP); Kunio Hosono, Fukushima (JP); Yasuji Hagiwara, Miyagi (JP)

(73) Assignee: Alps Alpine Co., Ltd. (JP)

( * ) Notice: Subject to any disclaimer, the term of this patent is extended or adjusted under 35 U.S.C. 154(b) by 190 days.

(21) Appl. No.: 18/781,202

(22) Filed: Jul. 23, 2024

(65) Prior Publication Data

US 2025/0073573 A1     Mar. 6, 2025

(30) Foreign Application Priority Data

Aug. 29, 2023    (JP) ................................. 2023-139212

(51) Int. Cl.
  *A63F 13/211*        (2014.01)
  *A63F 13/214*        (2014.01)
  *A63F 13/24*         (2014.01)

(52) U.S. Cl.
  CPC .......... *A63F 13/211* (2014.09); *A63F 13/214* (2014.09); *A63F 13/24* (2014.09)

(58) Field of Classification Search
  CPC ...... A63F 13/211; A63F 13/214; A63F 13/24; A63F 13/218; G01L 1/22; G01L 1/2287
  See application file for complete search history.

(56) References Cited

U.S. PATENT DOCUMENTS

| | | | | |
|---|---|---|---|---|
| 8,512,142 | B2 * | 8/2013 | Meldeau ............ | A63B 23/0458 |
| | | | | 482/52 |
| 8,619,044 | B2 * | 12/2013 | Pertuit .................... | G06F 3/016 |
| | | | | 345/173 |
| 8,947,372 | B2 * | 2/2015 | Fergusson ............. | G06F 1/1626 |
| | | | | 715/702 |
| 10,048,754 | B2 * | 8/2018 | Dooley .................. | G06F 3/016 |
| 10,061,458 | B1 * | 8/2018 | Bristol ............... | G06F 3/03547 |
| D890,263 | S  * | 7/2020 | Tong ............................ | D21/333 |
| 11,181,744 | B2 * | 11/2021 | Kang .................. | A63F 13/2145 |
| 11,554,319 | B2 * | 1/2023 | Morita .................. | A63F 13/214 |
| D1,003,358 | S  * | 10/2023 | Zhang ........................... | D21/333 |
| D1,111,097 | S  * | 2/2026 | Li ................................ | D14/401 |
| 2002/0033795 | A1 * | 3/2002 | Shahoian ............ | G06F 3/03547 |
| | | | | 345/156 |
| 2005/0151448 | A1 * | 7/2005 | Hikida ..................... | G01C 9/12 |
| | | | | 310/338 |

(Continued)

FOREIGN PATENT DOCUMENTS

WO        2021-176964  A1     9/2021

*Primary Examiner* — Dmitriy Bolotin
(74) *Attorney, Agent, or Firm* — Harness, Dickey & Pierce, P.L.C.

(57)        ABSTRACT

A controller has: a case; a manipulation unit, in a plate-like shape, disposed in the case so as to be exposed from the case; and a haptic sensor that detects a rotation manipulation for the manipulation unit. The haptic sensor has a distortion generating body fixed to the center of the manipulation unit and also has a distortion sensor disposed on the distortion generating body. The manipulation unit has non-slip portions, which are paired in the left-right direction, in the vicinity of both ends of the upper surface of the manipulation unit in the left-right direction.

8 Claims, 13 Drawing Sheets

(56)  References Cited

U.S. PATENT DOCUMENTS

| | | | |
|---|---|---|---|
| 2005/0162389 A1* | 7/2005 | Obermeyer | G06F 3/0338 |
| | | | 345/161 |
| 2009/0072662 A1* | 3/2009 | Sadler | G06F 1/3203 |
| | | | 345/173 |
| 2017/0239559 A1* | 8/2017 | Igarashi | G06F 3/0338 |
| 2017/0348596 A1 | 12/2017 | Igarashi et al. | |
| 2019/0388779 A1* | 12/2019 | Morita | A63F 13/214 |
| 2020/0114256 A1 | 4/2020 | Igarashi et al. | |
| 2020/0368611 A1 | 11/2020 | Igarashi et al. | |
| 2021/0060414 A1* | 3/2021 | Goldman | A63F 13/218 |
| 2021/0060418 A1* | 3/2021 | Kawashima | A63F 13/24 |
| 2021/0299552 A1* | 9/2021 | Morita | H04R 1/406 |
| 2021/0299554 A1* | 9/2021 | Kobayashi | A63F 13/24 |
| 2022/0016520 A1* | 1/2022 | Morita | H04R 1/406 |
| 2022/0019357 A1 | 1/2022 | Cho | |
| 2025/0073572 A1* | 3/2025 | Numata | G01C 9/06 |
| 2025/0073573 A1* | 3/2025 | Numata | A63F 13/24 |

* cited by examiner

<u>200</u>

X−

Y− Y+

X+

Z ⊗ → Y

X

<u>242</u>

X

X+ X−

GND ○ VCC

Y+ Y−

Y

CONTROLLER

CLAIM OF PRIORITY

This application claims benefit of Japanese Patent Application No. 2023-139212 filed on Aug. 29, 2023, which is hereby incorporated by reference.

BACKGROUND OF THE INVENTION

1. Field of the Invention

The present invention relates to a controller.

2. Description of the Related Art

U.S. Pat. No. 11,181,744B2 discloses an input device having a touch pad that doubles as a push button.

International Publication No. WO2021/176964 discloses a haptic sensor that uses a plurality of distortion sensors disposed on a distortion generating body to detect a force along the X axis, a force along the Y axis, and a force along the Z axis, which are applied to a manipulation plate, and to detect rotational moments around the X axis, Y axis, and Z axis.

With the input device disclosed in U.S. Pat. No. 11,181,744B2, however, a manipulation to move the touch pad in the front-back direction is not possible. Even if the haptic sensor disclosed in International Publication No. WO2021/176964 is combined with the input device disclosed in U.S. Pat. No. 11,181,744B2 so that the touch pad can be moved in the front-back direction, the finger of the manipulator slips on the font surface of the touch pad due to the front surface being smooth. This makes it impossible to reliably perform the manipulation to move the touch pad in the front-back direction.

SUMMARY OF THE INVENTION

A controller in an embodiment has: a case; a manipulation unit, in a plate-like shape, disposed in the case so as to be exposed from the case; and a haptic sensor that detects a rotation manipulation for the manipulation unit. The haptic sensor has a distortion generating body fixed to the center of the manipulation unit and also has a distortion sensor disposed on the distortion generating body. The manipulation unit has non-slip portions, which are paired in the left-right direction, in the vicinity of both ends of the upper surface of the manipulation unit in the left-right direction.

The controller in an embodiment can ensure that a rotation manipulation is reliably performed for a manipulation unit, in a plate-like shape, exposed from a case.

DESCRIPTION OF THE PREFERRED EMBODIMENTS

Figure 1:
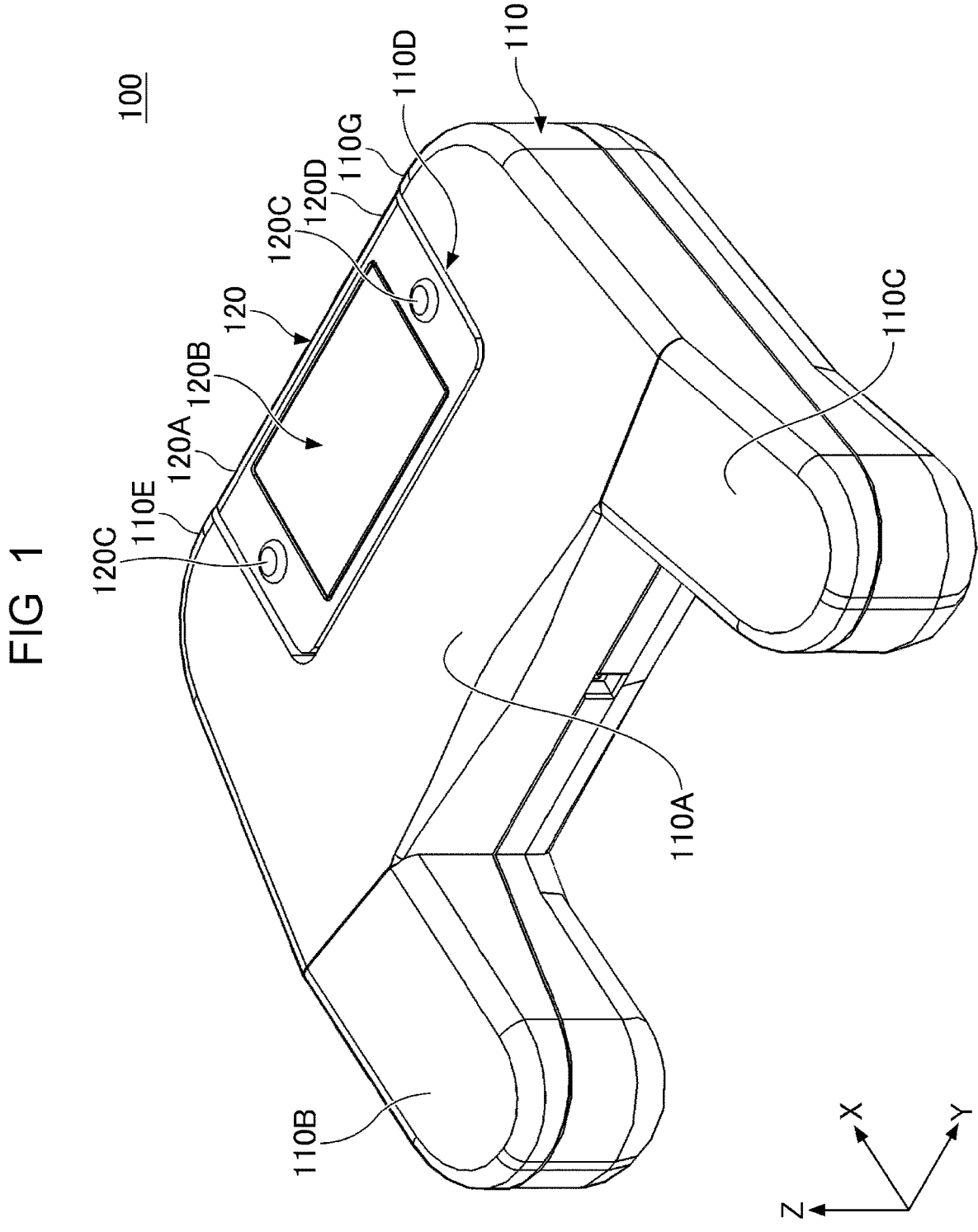
FIG. 1 is a perspective view illustrating the external appearance of a controller according to an embodiment.

Embodiments will be described below.

In the description below, the X-axis direction in the drawings will be taken as the front-back direction, the Y-axis direction in the drawings will be taken as the left-right direction, and the Z-axis direction in the drawings will be taken as the up-down direction, for convenience of explanation. Also, the positive X-axis direction will be taken as the forward direction, the positive Y-axis direction will be taken as the right direction, and the positive Z-axis direction will be taken as the upward direction. However, these directions indicate only a relative positional relationship in the device and do not limit a direction in which to install the device or manipulation directions. All constituent components, the relative positional relationships of which are equivalent in the device, including constituent components that are installed or manipulated in different directions, are included in the scope of rights of the present invention.

Outline of a Controller 100

FIG. 1 is a perspective view illustrating the external appearance of the controller 100 according to an embodiment. The controller 100 in FIG. 1 is used in, for example, a game machine, in which case the controller 100 is manipulated by a manipulator, that is, the player of a game.

As illustrated in FIG. 1, the controller 100 has a case 110, which is a member formed from a resin material so as to form the outside shape of the controller 100.

The case 110 has a central portion 110A, a left handle 110B disposed on the left side (negative side of the Y axis) of the central portion 110A, and a right handle 110C disposed on the right side (positive side of the Y axis) of the central portion 110A. The left handle 110B and right handle 110C are shaped so as to be longer than the central portion 110A in the front-back direction (X-axis direction). Specifically, the left handle 110B and right handle 110C protrude backward (in the negative direction of the X axis) from the rear surface of the central portion 110A.

Thus, the shape of the case 110 makes it easy for the manipulator to hold the left handle 110B with the left hand and to hold the right handle 110C with the right hand.

A recess 110D is formed at the front end (the end in the positive direction of the X axis) of the central portion 110A of the case 110 so as to be recessed downward (in the negative direction of the Z axis) from an upper surface 110E of the case 110. The controller 100 may have a touch pad unit 120 in the recess 110D in the case 110.

The recess 110D and touch pad unit 120 have a rectangular shape in which the left and right direction (Y-axis direction) is the longitudinal direction in plan view from above (from the positive side of the Z axis). The rectangular shape of the touch pad unit 120 is smaller than the rectangular shape of the recess 110D in the case 110. Thus, clearances may be formed between the outer circumferential surfaces of the touch pad unit 120 and the inner circumferential surfaces of the recess 110D.

The upper surface 110E (surface on the positive side of the Z axis) of the case 110 and an upper surface 120A (surface on the positive side of the Z axis) of the touch pad unit 120 may be flush with each other.

The touch pad unit 120 has a touch manipulation surface 120B on the upper surface 120A (surface on the positive side of the Z axis), the touch manipulation surface 120B having a rectangular shape in which the left and right direction (Y-axis direction) is the longitudinal direction. The touch pad unit 120 accepts a touch manipulation performed by the manipulator on the touch manipulation surface 120B.

The touch pad unit 120 is provided so as to be displaceable with respect to the case 110, so a pressing manipulation, a tilt manipulation, and a rotation manipulation by the manipulator are possible.

In a pressing manipulation for the touch pad unit 120, the central portion of the touch manipulation surface 120B of the touch pad unit 120 is pressed downward (in the negative direction of the Z axis). When a pressing manipulation is performed, a compression load is applied downward (in the negative direction of the Z axis) while the touch pad unit 120 is kept horizontally.

In a tilt manipulation for the touch pad unit 120, part of the peripheral portion (other than the central portion) of the touch manipulation surface 120B is pressed downward (in the negative direction of the Z axis). When a tilt manipulation is performed, the touch pad unit 120 undergoes a bend load applied to the central axis of the touch pad unit 120, the central axis passing through the center of the touch pad unit 120 (central axis parallel to the Z axis).

In a rotation manipulation for the touch pad unit 120, the touch pad unit 120 is twisted around the central axis passing through the center of the touch pad unit 120 (central axis parallel to the Z axis). When a rotation manipulation is performed, the touch pad unit 120 undergoes a twist load around the central axis passing through the center of the touch pad unit 120 (central axis parallel to the Z axis).

In actual practice, the controller 100 includes a plurality of buttons, an analog stick, and other input devices, besides the touch pad unit 120. In the present invention, drawings and descriptions of these other input devices are omitted.

Structure of the Controller 100

Figure 2:
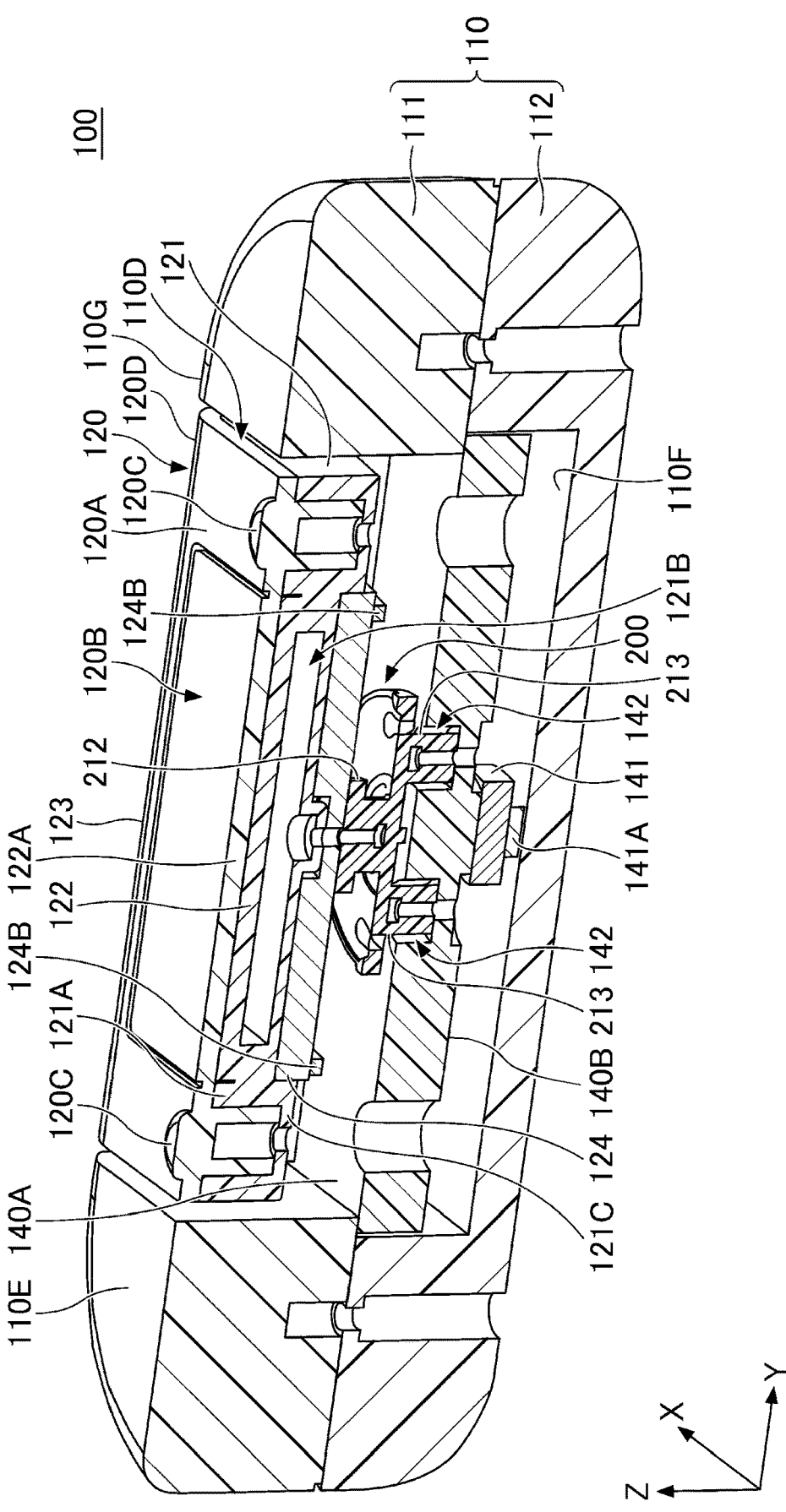
FIG. 2 is a sectional view of the controller according to the embodiment.
Figure 3:
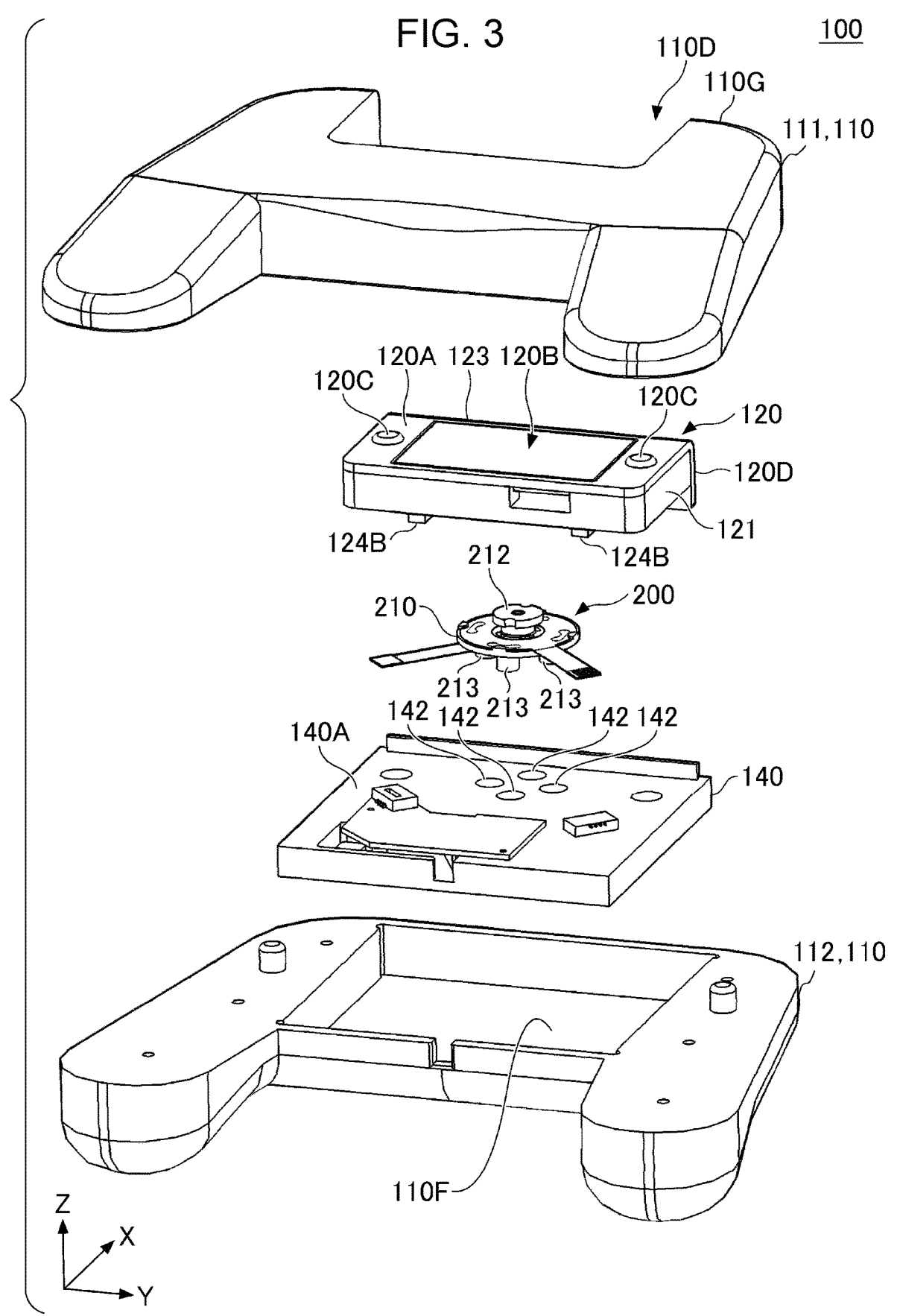
FIG. 3 is an exploded perspective view of the controller according to the embodiment when viewed from above.
Figure 4:
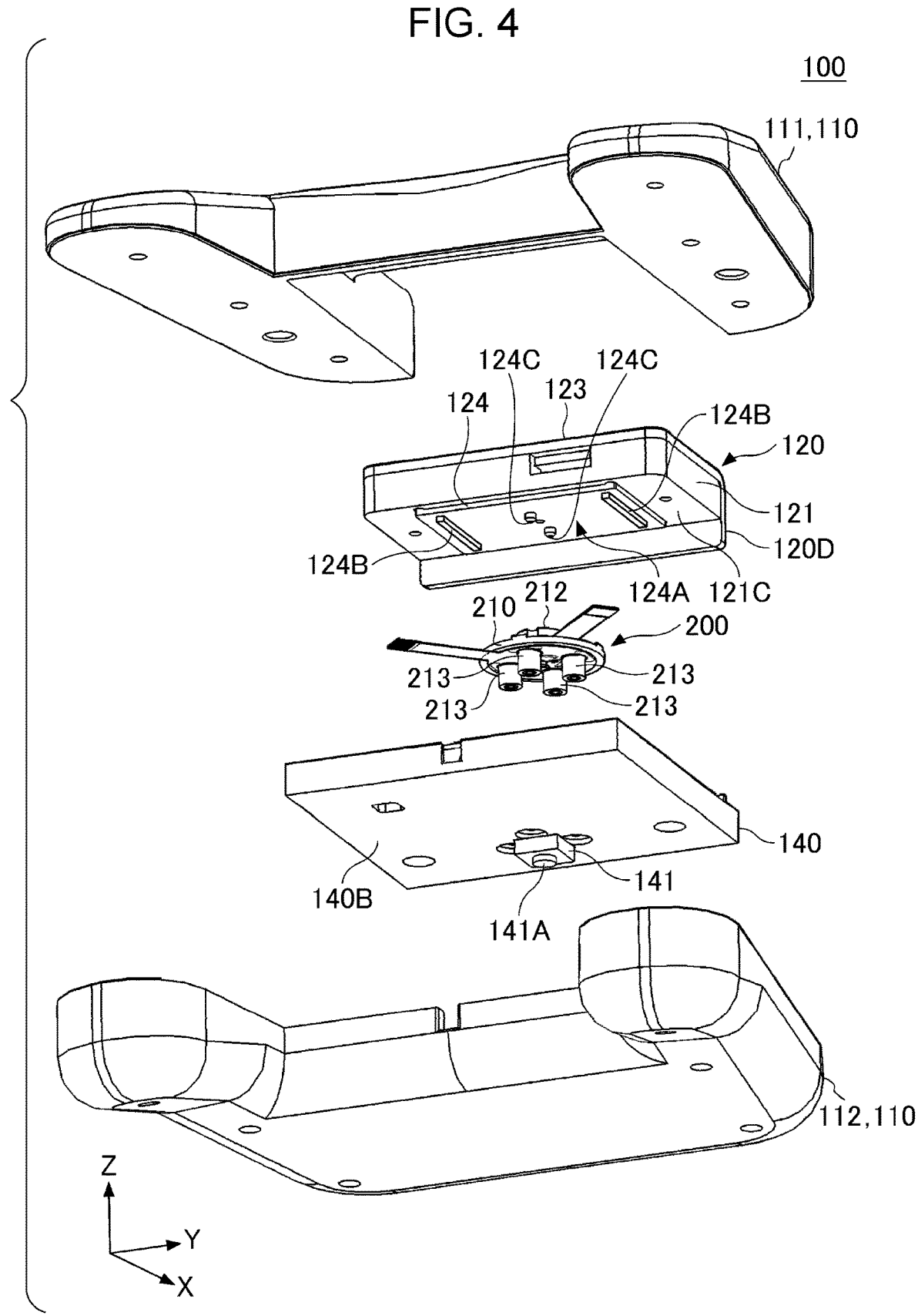
FIG. 4 is an exploded perspective view of the controller according to the embodiment when viewed from below.

FIG. 2 is a sectional view of the controller 100 according to the embodiment. FIG. 3 is an exploded perspective view of the controller 100 according to the embodiment when viewed from above (from the positive side of the Z axis). FIG. 4 is an exploded perspective view of the controller 100 according to the embodiment when viewed from below (from the negative side of the Z axis).

As illustrated in FIGS. 2 to 4, the controller 100 has a haptic sensor 200 and a substrate 140 besides the case 110 and touch pad unit 120.

The case 110, which is a member forming the outside shape of the controller 100, supports other constituent elements. The case 110 is formed from a relatively hard resin material. The case 110 has an upper case 111 forming the upper portion (on the positive side of the Z axis) of the case 110 and a lower case 112 forming the lower portion (on the negative side of the Z axis) of the case 110. The upper case 111 and lower case 112 of the case 110 are fixed together by being screwed in a state in which they are combined together. That is, when the case 110 is unscrewed, it can be divided into two parts, upper case 111 and lower case 112. The front (portion on the positive side of the X axis) of the upper case 111 is U-shaped when viewed from above (from the positive side of the Z axis). The recess 110D is the central portion of the U-shaped portion of the upper case 111. The recess 110D is a depression having a bottom in the lower case 112. The width of the recess 110D is smaller in the upper case 111 than in the lower case 112.

The touch pad unit 120 has a holder 121, a touch pad 122, a cover plate 123, and a manipulation plate 124.

The holder 121, which is a member formed from a resin material, holds the touch pad 122 and cover plate 123. The holder 121 has a thin rectangular parallelepiped shape in the up-down direction (Z-axis direction). The holder 121 also has a rectangular shape in which the left and right direction (Y-axis direction) is the longitudinal direction in plan view from above (from the positive side of the Z axis). The holder 121 has a recess 121B, which is recessed downward (negative direction of the Z axis) from an upper surface 121A of the holder 121. The recess 121B has a rectangular shape in which the left and right direction (Y-axis direction) is the longitudinal direction in plan view from above (from the positive side of the Z axis). The touch pad 122 is placed in the interior of the recess 121B.

The touch pad 122 is a device formed in a horizontal flat pate shape. The touch pad 122 detects a touch manipulation performed on the touch manipulation surface 120B with a finger of the manipulator. For example, the touch pad 122 has a circuit board, formed from a resin material, in a flat plate-like shape, and also has a sheet-like capacitive sensor stacked on the upper surface of the circuit board. The touch pad 122 detects, with the capacitive sensor, a position at which the finger of the manipulator is in contact with the touch manipulation surface 120B. The touch pad 122 is placed horizontally in the recess 121B in the holder 121. With the touch pad 122 placed in the recess 121B in the holder 121, an upper surface 122A of the touch pad 122 is flush with the upper surface 121A of the holder 121.

The cover plate 123, which is a member in a horizontal flat plate-like shape, is stacked on the upper surface 121A of the holder 121, covering the upper surface 121A of the holder 121 and the upper surface 122A of the touch pad 122. The cover plate 123 is formed from a hard material such as, for example, a resin material or a glass material. In this embodiment, the cover plate 123 has a rectangular shape, which is the same as the shape of the holder 121, in plan view from above (from the positive side of the Z axis), as an example. The upper surface of the cover plate 123 is the touch manipulation surface 120B of the touch pad unit 120.

The manipulation plate 124, which is a member in a horizontal flat plate-like shape, is disposed on a lower surface 121C of the holder 121 so that the manipulation plate 124 and holder 121 overlay each other, and is fixed to the lower surface 121C of the holder 121. The manipulation plate 124 is formed from a hard material such as, for example, a resin material or a metal material. In this embodiment, the manipulation plate 124 may have a rectangular shape in which the left and right direction (Y-axis direction) is the longitudinal direction in plan view from bellow (from the negative side of the Z axis), as an example. The manipulation plate 124 has a fixing portion 124A, to which the haptic sensor 200 (specifically, a first column 212 described later) is fixed, at the central portion of the lower surface of the manipulation plate 124. Protrusions 124C on the manipulation plate 124 are fixed to recesses 212A in the first column 212. The manipulation plate 124 is fixed to the substrate 140 through the haptic sensor 200.

The manipulation plate 124 may have stoppers 124B, each of which is disposed at one of both ends of the lower surface of the manipulation plate 124 in the left-right direction along the relevant short edge of the manipulation plate 124. When the manipulation plate 124 is tilted by a predetermined angle with respect to the substrate 140, either or both of the stoppers 124B abut an upper surface 140A of the substrate 140, restricting an amount by which the manipulation plate 124 is displaced (an angle by which the manipulation plate 124 is tilted). The stoppers 124B may be disposed on the upper surface 140A of the substrate 140.

The touch pad unit 120 structured as described above is placed in the recess 110D formed in the upper case 111 of the case 110. The touch pad unit 120 is fixed to the substrate 140 through the fixing portion 124A of the manipulation plate 124 and the haptic sensor 200 (specifically, the first column 212 described later). Thus, the touch pad unit 120 is displaceably supported in the case 110 by the haptic sensor 200 in the recess 110D, enabling the haptic sensor 200 to be manipulated.

The touch pad unit 120 is an example of a manipulation unit. The touch pad unit 120 has non-slip portions 120C, which are paired in the left-right direction, in the vicinity of both ends of the upper surface 120A of the touch pad unit 120 in the left-right direction. In this embodiment, each non-slip portion 120C is a protrusion having a circular shape in plan view. In this embodiment, the non-slip portions 120C are formed integrally with the cover plate 123 of the touch pad unit 120.

Each non-slip portion 120C is disposed at a position at which the thumb of the hand of the manipulator can be retained in a state in which the manipulator holds the controller 100 with both hands. When the thumbs of both hands of the manipulator are retained by the non-slip portions 120C, the manipulator can easily perform a manipulation by which a load is applied to the touch pad unit 120 while the manipulator holds the controller 100 with both hands. When the manipulator applies forces by moving the left and right thumb in opposite directions, forward and backward, a twist load (rotation manipulation) can be detected. When the manipulator presses any one of the left and right thumbs downward, a bend load (tilt manipulation) can be detected. When the manipulator presses the front portion of the touch pad unit 120 with the left and right thumbs or when the manipulator presses the rear portion of the touch pad unit 120 with the left and right thumbs, a bend load (tilt manipulation) can also be detected.

The touch pad unit 120 is disposed in the recess 110D in the case 110. A side surface 120D of the touch pad unit 120 on the front side (positive side of the X axis) is flush with a side surface 110G of the case 110 on the front side (positive side of the X axis).

The touch pad unit 120 has the touch pad 122 of capacitive type as described above. In the touch pad unit 120, the touch pad 122 is disposed between the non-slip portions 120C paired in the left-right direction.

The shape and position of the non-slip portion 120C and its count are not limited to the examples taken in this embodiment. The non-slip portion 120C may be provided separately from the cover plate 123 and may then be attached to the cover plate 123.

In the recess 110D in the case 110, the haptic sensor 200 is disposed below the touch pad unit 120 (on the negative side of the Z axis) and above the substrate 140 (on the positive side of the Z axis). The haptic sensor 200 detects the displacement of the touch pad unit 120. Specifically, the haptic sensor 200, which has a distortion generating body 210, is fixed as follows: the first column 212, which is part of the distortion generating body 210, is fixed to the manipulation plate 124 of the touch pad unit 120, and four second columns 213, which are part of the distortion generating body 210, are fixed to the substrate 140. Thus, when a manipulation (tilt manipulation, rotation manipulation, or pressing manipulation) is performed for the touch pad unit 120, the distortion generating body 210 is distorted, so the haptic sensor 200 can detect the distortion with a plurality of distortion sensors 222 and 233 provided on the distortion generating body 210. The first column 212 is fixed to the center of the touch pad unit 120. Therefore, forces with which the left end and right end of the touch pad unit 120 are pressed in opposite directions, forward and backward (in the positive direction of the X axis and negative direction of the X axis) are exerted as a twist load, which is detected as a rotation manipulation. A force with which one end of the touch pad unit 120 is pressed downward (in the negative direction of the Z axis) is exerted as a bend load, which is detected as a tilt manipulation. Forces with which both ends of the touch pad unit 120 are pressed downward (in the negative direction of the Z axis) are exerted as a compression load, which is detected as a pressing manipulation. The structure of the haptic sensor 200 will be described later in detail with reference to FIGS. 5 to 10.

The substrate 140 is a member that is formed from a resin material in a horizontal flat plate-like shape. The substrate 140 has a rectangular shape in which the left and right direction (Y-axis direction) is the longitudinal direction in plan view from above (from the positive side of the Z axis). The width (length in the Y-axis direction) of the substrate 140 is smaller than the width of the recess 110D in the lower case 112. The width (length in the Y-axis direction) of the substrate 140 is larger than the width of the recess 110D in the upper case 111. Therefore, the substrate 140 can be moved in the recess 110D in the lower case 112. The left end and right end of the upper surface of the substrate 140 are in contact with the upper case 111 due to the restoring force of a pressing portion 141A included in a push switch 141. When the restoring force of the pressing portion 141A of the push switch 141 is weak, a helical compression spring may be provided between the substrate 140 and a bottom surface 110F of the recess 110D in the case 110.

Four recesses 142, which are circular, may be formed in the upper surface 140A of the substrate 140 in a cross arrangement. Each of the four recesses 142 is shaped so as to be recessed downward (in the negative direction of the Z axis) from the upper surface 140A. The recess 142 has a predetermined depth in the up-down direction (Z-axis direction) and is circular in plan view from above (from the positive side of the Z axis). The four second columns 213 of the distortion generating body 210 of the haptic sensor 200 may be inserted into the four recesses 142, which are circular, from above (from the positive side of the Z axis) and are then screwed from below (from the negative side of the Z axis).

The push switch 141 is disposed at the central portion of a lower surface 140B of the substrate 140 so that the pressing portion 141A faces downward. That is, the push switch 141 is disposed so that the pressing portion 141A faces the bottom surface 110F of the recess 110D in the case 110. The total thickness of the substrate 140 and push switch 141 is substantially equal to the depth of the recess 110D in the lower case 112. Therefore, the left end and right end of the upper surface of the substrate 140 are in contact with the lower surface of the upper case 111. The total thickness of the touch pad unit 120 and haptic sensor 200 is equal to the thickness of the upper case 111. The upper surface 120A of the touch pad unit 120 and the upper surface 110E of the upper case 111 may be flush with each other. The push switch 141 is structured so that when the pressing portion 141A is pressed, the push switch 141 is switched from an off state to an on state. When the touch pad unit 120 is pressed downward (in the negative direction of the Z axis), the pressing portion 141A of the push switch 141 is pressed by the bottom surface 110F of the recess 110D in the case 110, switching the push switch 141 to the on state. When the center of the touch pad unit 120 is pressed downward (in the negative direction of the Z axis) or the left end and right end of the touch pad unit 120 are concurrently pressed downward (in the negative direction of the Z axis), the touch pad unit 120 moves downward (in the negative direction of the Z axis) while the touch pad unit 120 is kept in a horizontal orientation, switching the push switch 141 to the on state. When one end of the touch pad unit 120 is pressed downward (in the negative direction of the Z axis), the touch pad unit 120 is tilted together with the substrate 140, turning on the push switch 141. When the end of the touch pad unit 120 on one side is pressed downward, the end of the substrate 140 on the opposite side acts as a fulcrum and the substrate 140 operates as a type 2 lever. Thus, the push switch 141 can detect a pressing manipulation for the touch pad unit 120.

Operation of the Controller 100

With the controller 100 in the embodiment, when a tilt manipulation is performed for the touch pad unit 120, the touch pad unit 120, haptic sensor 200, and substrate 140 are first tilted together, turning on the push switch 141. When one end of the lower surface 140B of the substrate 140 comes into contact with the bottom surface 110F of the recess 110D in the lower case 112 and the end of the upper surface 140A of the substrate 140 in the opposite direction from the one end of the lower surface 140B of the substrate 140 comes into contact with the lower surface of the upper case 111, the substrate 140 is fixed to the case 110 and can be no longer moved. Furthermore, when a downward force is applied to an end of the touch pad unit 120, a bend load is applied to the first column 212 of the distortion generating body 210 fixed to the touch pad unit 120, generating distortion around the first column 212 at a base 211 of the distortion generating body 210. With the controller 100 in the embodiment, the four second distortion sensors 233 provided at the base 211 of the distortion generating body 210 detect the distortion around the first column 212 on the base 211 of the distortion generating body 210. Therefore, the controller 100 can detect a tilt manipulation (a tilt direction and the magnitude of the load) for the touch pad unit 120. When the push switch 141 is turned on, its reaction force changes, generating a click feel. Therefore, the manipulator can instinctively grasp the lower limit of a tilt manipulation.

With the controller 100 in the embodiment, when a pressing manipulation is performed for the touch pad unit 120, the touch pad unit 120 moves downward (in the negative direction of the Z axis) while the touch pad unit 120 is kept in a horizontal state, turning on the push switch 141. Furthermore, when a force is applied to the center of the touch pad unit 120 or forces are evenly applied to both ends of the touch pad unit 120, a compression load is applied to the first column 212 of the distortion generating body 210 fixed to the touch pad unit 120, generating distortion abound the central portion of the base 211 of the distortion generating body 210. With the controller 100 in the embodiment, the four second distortion sensors 233 disposed at the base 211 of the distortion generating body 210 detect the distortion around the central portion of the base 211 of the distortion generating body 210. Therefore, the controller 100 can detect the pressing manipulation (the magnitude of the load) for the touch pad unit 120.

With the controller 100 in the embodiment, when a rotation manipulation is performed for the touch pad unit 120, the touch pad unit 120 slightly rotates around its central axis. At that time, the base 211 of the distortion generating body 210 fixed to the touch pad unit 120 slightly rotates and each of the four second columns 213 of the distortion generating body 210 tilts, generating distortion around each of the four second columns 213. With the controller 100 in the embodiment, eight first distortion sensors 222 disposed at the base 211 of the distortion generating body 210 detect this distortion around the four second columns 213 at the base 211 of the distortion generating body 210. Therefore, the controller 100 can detect the rotation manipulation (rotational direction and load) for the touch pad unit 120. When clearances between the touch pad unit 120 and the upper case 111 are adjusted, it is possible to prevent an excess twist load from being applied to the distortion generating body 210.

Detailed Description of the Structure of the Haptic Sensor 200

Figure 5:
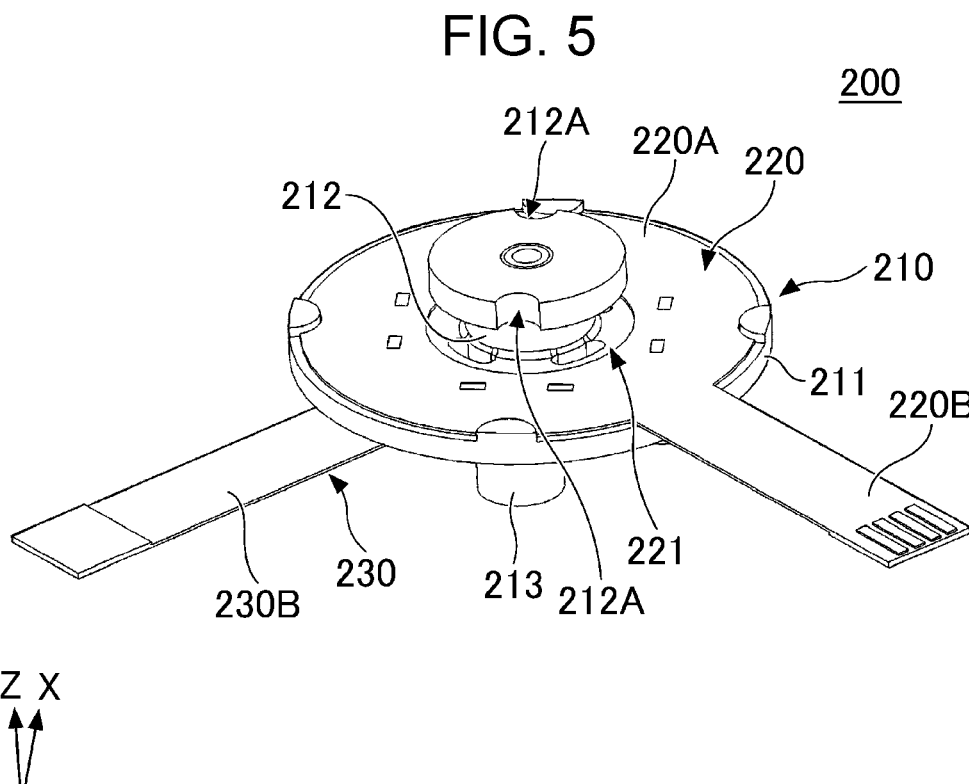
FIG. 5 is a perspective view illustrating the external appearance of a haptic sensor according to an embodiment when viewed from above (from the positive side of the Z axis)
Figure 6:
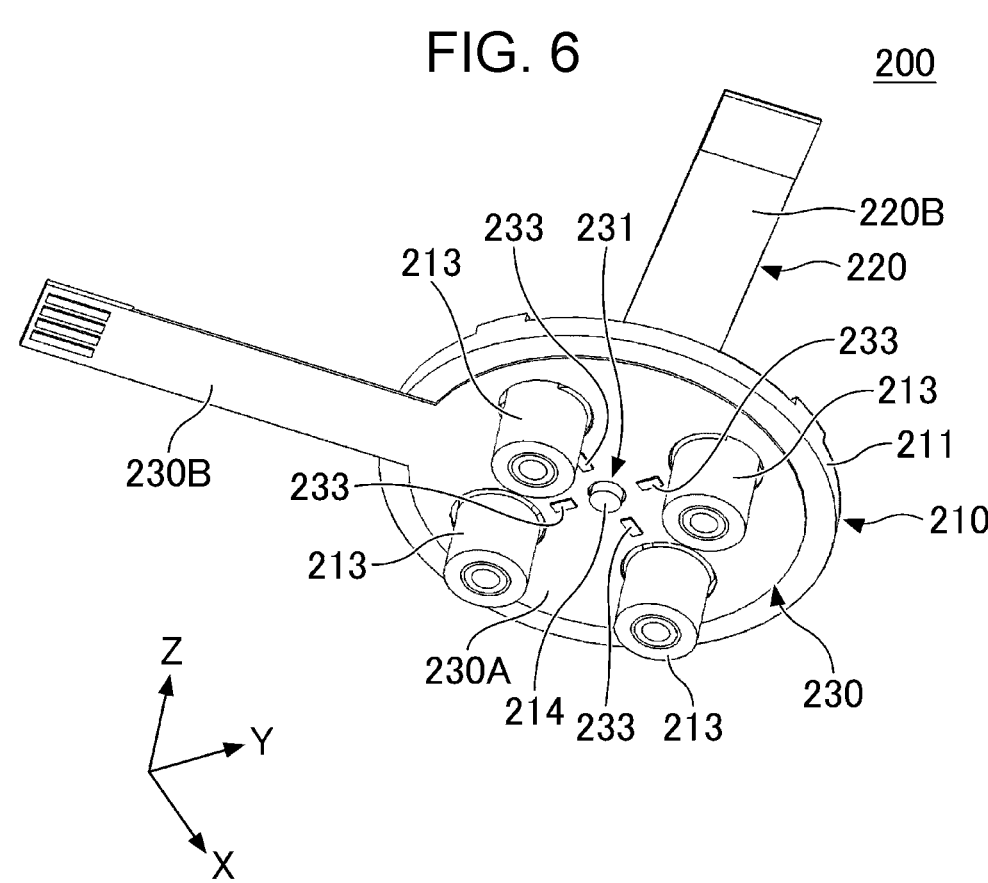
FIG. 6 is a perspective view illustrating the external appearance of the haptic sensor according to the embodiment when viewed from below (from the negative side of the Z axis)
Figure 7:
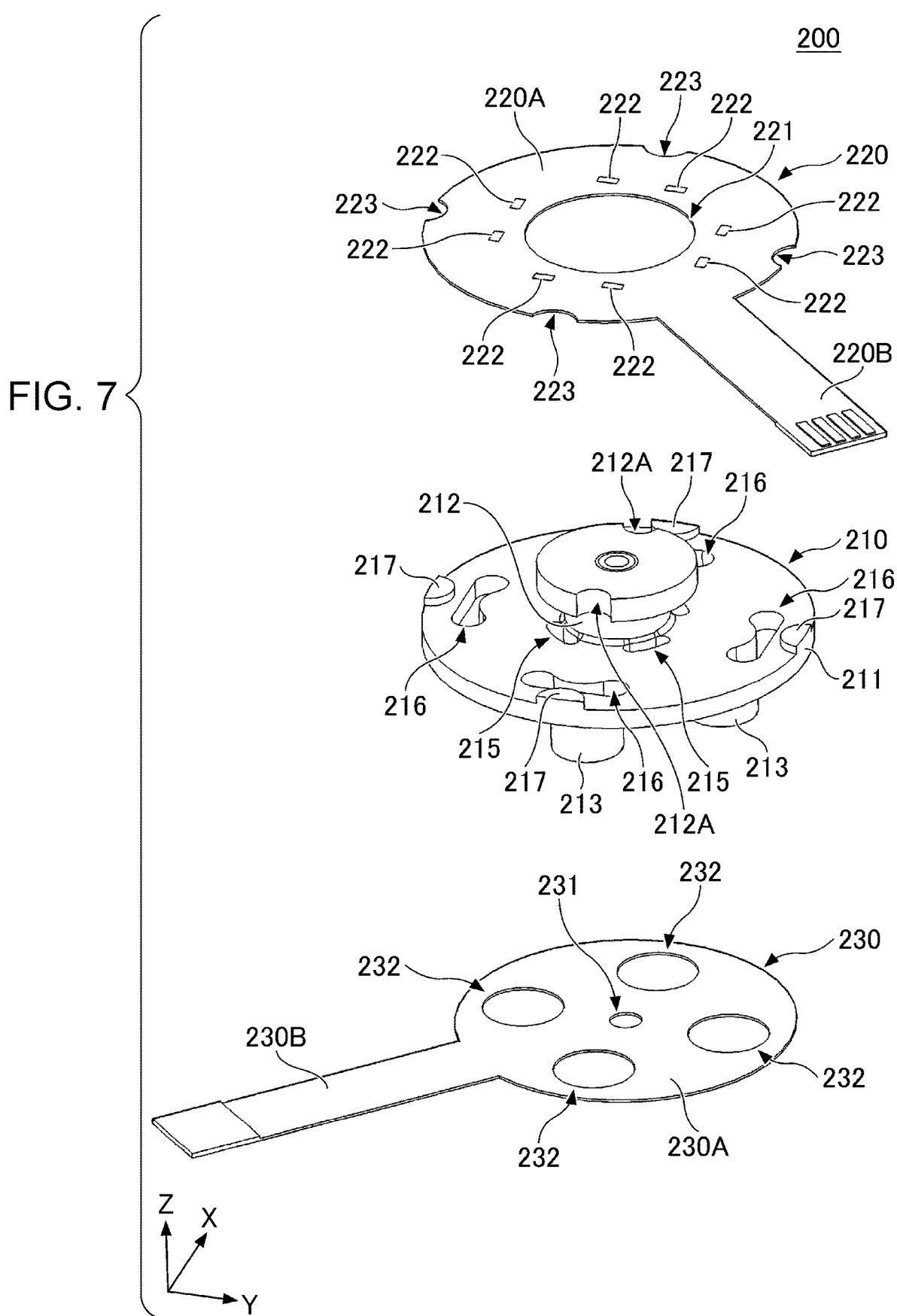
FIG. 7 is an exploded perspective view of the haptic sensor according to the embodiment when viewed from above (from the positive side of the Z axis)
Figure 8:
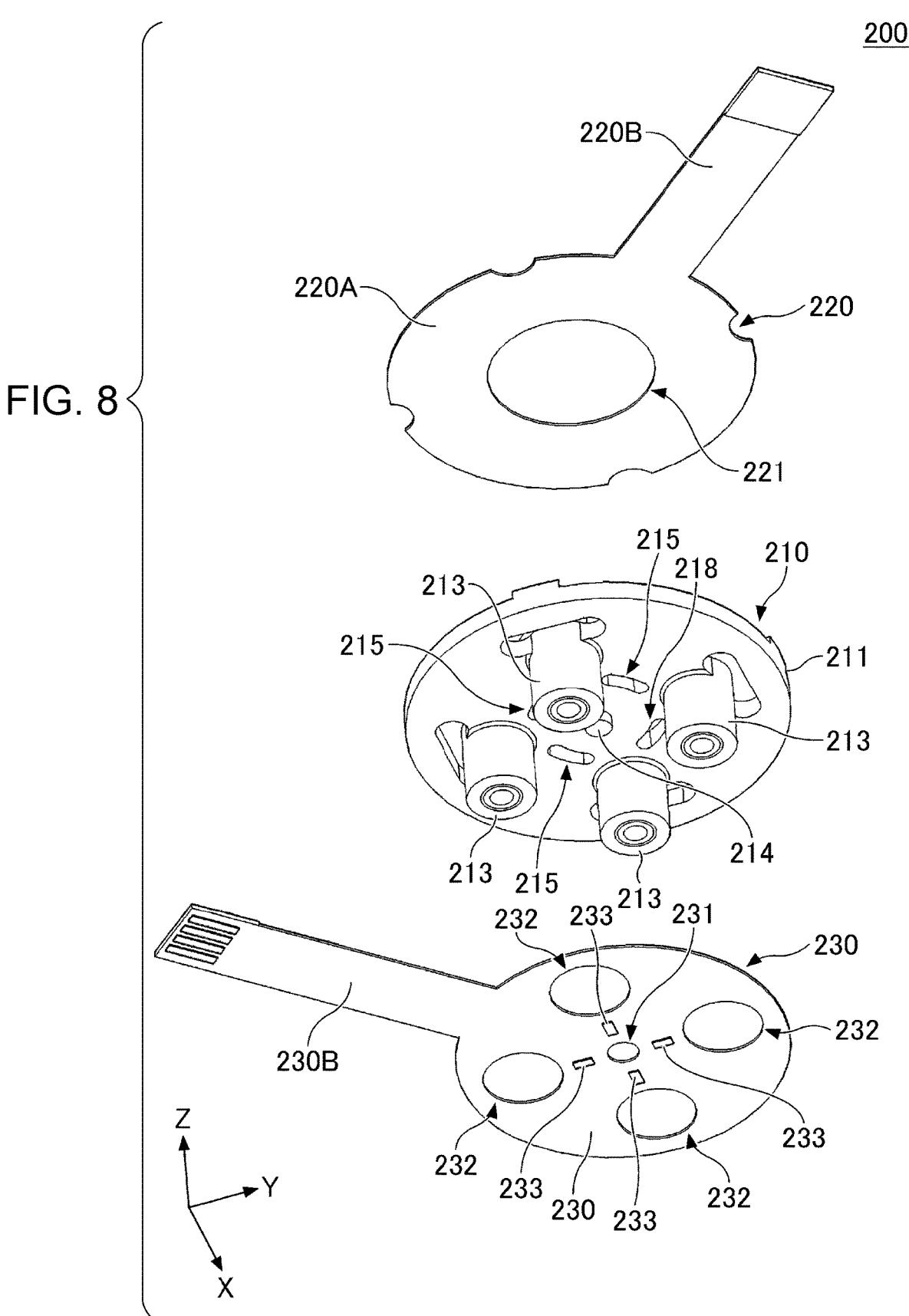
FIG. 8 is an exploded perspective view of the haptic sensor according to the embodiment when viewed from below (from the negative side of the Z axis)

FIG. 5 is a perspective view illustrating the external appearance of the haptic sensor 200 according to an embodiment when viewed from above (from the positive side of the Z axis). FIG. 6 is a perspective view illustrating the external appearance of the haptic sensor 200 according to the embodiment when viewed from below (from the negative side of the Z axis). FIG. 7 is an exploded perspective view of the haptic sensor 200 according to the embodiment when viewed from above (from the positive side of the Z axis). FIG. 8 is an exploded perspective view of the haptic sensor 200 according to the embodiment when viewed from below (from the negative side of the Z axis).

As illustrated in FIGS. 5 to 8, the haptic sensor 200 has a first flexible circuit board 220 and a second flexible circuit board 230, besides the distortion generating body 210.

Upon undergoing a manipulation load from the touch pad unit 120, the distortion generating body 210, which is a member formed from a resin material, is distorted. The distortion generating body 210 has a central protrusion 214, four first through-holes 215, four second through-holes 216, and four engaging protrusions 217, besides the four second columns 213, base 211, and first column 212.

The base 211 has a horizontal discoidal shape having a certain thickness in the up-down direction (Z-axis direction).

The first column 212 may be a columnar portion vertically erected upward (in the positive direction of the Z-axis) from the central portion of the upper surface of the base 211. The first column 212 is provided mainly to detect a tilt manipulation for the touch pad unit 120. The upper portion of the first column 212 has a discoidal shape. A pair of recesses 212A, which are recessed from the outer circumference toward the center, are formed in the upper portion of the first column 212 at intervals of 180 degrees.

The four second columns 213 may be columnar portions that extend downward (in the negative direction of the Z axis) and are equally spaced (that is, disposed at intervals of 90 degrees) on a single circumference, the center of which is the central protrusion 214 on the lower surface of the base 211 (that is, the central portion of the base 211), in four directions with respect to the central protrusion 214. That is, the four second columns 213 may be disposed in four directions, which may be equally spaced at intervals of 90 degrees with respect to the first column 212. The four second column 213 are provided mainly to detect a rotation manipulation for the touch pad unit 120.

The central protrusion 214 is a columnar portion disposed at the central portion of the lower surface of the base 211 so as to protrude downward (in the negative direction of the Z axis). The central protrusion 214 is inserted into a central opening 231, which is formed in a base 230A provided as part of the second flexible circuit board 230, to correctly position the center of the base 230A of the second flexible circuit board 230.

The central protrusion 214 is disposed so as to face the upper surface 140A of the substrate 140 at a predetermined distance. Therefore, when the amount of stroke of the touch pad unit 120 reaches the predetermined distance during a pressing manipulation for it, the central protrusion 214 abuts the upper surface 140A of the substrate 140, restricting further deformation (depression) of the base 211. Thus, the central protrusion 214 can suppress damage to the distortion sensors 222 and 233 due to their excessive deformation.

The four first through-holes 215 may be formed around the first column 212 on the base 211 in four directions, which are equally spaced at intervals of 90 degrees with respect to the first column 212. Each of the four first through-holes 215 extends through the base 211 in the up-down direction (Z-axis direction). In particular, each of the four first through-holes 215 is formed in a direction between two adjacent second columns 213 (that is, in a direction different from the directions in which the two second columns 213 are disposed) with respect to the first column 212.

The four second through-holes 216 may be formed on the same side of the four second columns 213 on the base 211 as the outer circumference of the base 211. Each of the four second through-holes 216 extends through the base 211 in the up-down direction (Z-axis direction).

The four engaging protrusions 217 may be disposed on the same side of the four second through-holes 216 in the base 211 as the outer circumference of the base 211. Each of the four engaging protrusions 217 protrudes upward (in the positive direction of the Z-axis) from the upper surface of the base 211. Each of the four engaging protrusions 217 engages one of four engaging portions 223 formed along the outer circumferential edge of a base 220A provided as part of the first flexible circuit board 220.

The first flexible circuit board 220 is a flexible film-like wiring member. The first flexible circuit board 220 has a lead portion 220B besides the base 220A.

The base 220A, which is in a circular ring shape, is fixed to the upper surface of the base 211 of the distortion generating body 210. An opening 221, which is circular, is formed at the central portion of the base 220A. The first column 212 of the distortion generating body 210 is inserted into the interior of the opening 221.

The lead portion 220B is a strip-shaped portion that linearly extends from the outer circumferential edge of the base 220A toward the outside (in the negative direction of the X axis and in the positive direction of the Y axis). The end of the lead portion 220B is electrically connected to the substrate 140.

On the first flexible circuit board 220, the eight first distortion sensors 222 may be disposed around the opening 221 in the upper surface of the base 220A (that is, around the first column 212 of the distortion generating body 210). Each of the eight first distortion sensors 222 is a resistive element printed on the upper surface of the base 220A. The eight first distortion sensors 222 are provided mainly to detect a rotation manipulation for the touch pad unit 120.

At the first flexible circuit board 220, the four engaging portions 223, which are recessed toward the inner circumference of the of the base 220A, are formed along the outer circumferential edge of the base 220A in four directions, which are the same as the four directions in which the four second columns 213 are disposed. Each of the four engaging portions 223 engages one of the four engaging protrusions 217 disposed on the base 211 of the distortion generating body 210.

The first flexible circuit board 220 can output a distortion detection signal (analog signal) that represents distortion of the base 211, the distortion being detected by each of the eight first distortion sensors 222, to the substrate 140 through the lead portion 220B.

The second flexible circuit board 230 is a flexible film-like wiring member. The second flexible circuit board 230 has a lead portion 230B besides the base 230A.

The base 230A, which is in a circular ring shape, is fixed to the lower surface of the base 211 of the distortion generating body 210. A central opening 231, which is circular, is formed at the central portion of the base 230A. The central protrusion 214 disposed on the lower surface of the base 211 of the distortion generating body 210 is inserted into the central opening 231.

Four peripheral openings 232, which are circular, may be formed around the central opening 231 in the base 230A on a single circumference, the center of which is the central opening 231 (that is, the central portion of the base 230A) at equal intervals (that is, at intervals of 90 degrees). Each of the four second columns 213 of the distortion generating body 210 is inserted into one of the four peripheral openings 232.

The lead portion 230B is a strip-shaped portion that linearly extends from the outer circumferential edge of the base 230A toward the outside (in the negative direction of the X axis and in the positive direction of the Y axis). The end of the lead portion 230B is electrically connected to the substrate 140.

On the second flexible circuit board 230, the four second distortion sensors 233 may be disposed around the central opening 231 in the lower surface of the base 230A (that is, around the central protrusion 214 of the distortion generating body 210). Each of the four second distortion sensors 233 is a resistive element printed on the lower surface of the base 230A. The four second distortion sensors 233 are provided mainly to detect a tilt manipulation for the touch pad unit 120.

The second flexible circuit board 230 can output a distortion detection signal (analog signal) that represents distortion of the base 211, the distortion being detected by each of the four second distortion sensors 233, to the substrate 140 through the lead portion 230B.

Layout of the First Distortion Sensors 222

Figure 9:
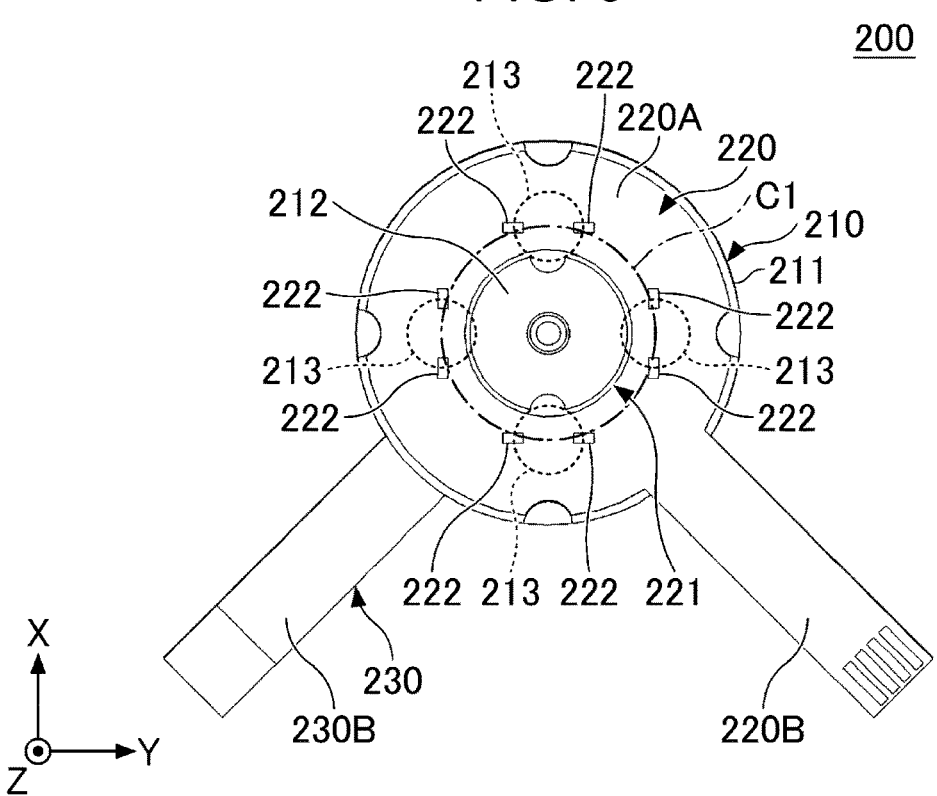
FIG. 9 is a front view of the haptic sensor according to the embodiment.

Next, the layout of the eight first distortion sensors 222 in the haptic sensor 200 will be described with reference to FIG. 9. FIG. 9 is a front view of the haptic sensor 200 according to the embodiment.

As illustrated in FIG. 9, the haptic sensor 200 has two first distortion sensors 222 on the upper surface of the base 211 of the distortion generating body 210 in each of the four directions (right direction (positive direction of the Y axis), left direction (negative direction of the Y axis), front direction (positive direction of the X axis), and back direction (negative direction of the X axis)) with respect to the first column 212. The two first distortion sensors 222 in each direction are disposed on the same circumference as a first circumference C1 passing through the four second columns 213 disposed on the rear side (negative side of the Z axis), with a predetermined amount of spacing between the two first distortion sensors 222. That is, the first distortion sensors 222 are arranged in the circumferential direction of the first circumference C1. Thus, around the first column 212, the eight first distortion sensors 222 are disposed on the same circumference as the first circumference C1 passing through the four second columns 213. Furthermore, the position of each of the eight first distortion sensors 222 may match, in the Z-axis direction, a position on the outer edge of the relevant second column 213 disposed on the rear side (negative side of the Z axis).

Each of the eight first distortion sensors 222 is oriented so that the circumferential direction of the first circumference C1 matches a detection direction. Thus, when a rotation manipulation is performed for the touch pad unit 120, the resistance of each of the eight first distortion sensors 222 changes due to its expansion or contraction in the circumferential direction of the first circumference C1, so the rotation manipulation can be detected.

The base 220A, in a circular ring shape enclosing the first column 212, of the first flexible circuit board 220 is disposed on the upper surface of the base 211 of the distortion generating body 210. On the upper surface of the base 220A of the first flexible circuit board 220, the eight first distortion sensors 222 are disposed on the same circumference as the first circumference C1 passing through the four second columns 213 so as to enclose the first column 212.

When a rotation manipulation is performed for the touch pad unit 120 and the base 211 is thereby distorted around the four second columns 213 through the four second columns 213, each of the eight first distortion sensors 222 is deformed (expanded or contracted) according to the distortion of the base 211. As a result, the resistance of each first distortion sensor 222 changes accordingly. Thus, the eight first distortion sensors 222 can detect the distortion, caused by a rotation manipulation for the touch pad unit 120, of the base 211 and can thereby detect the rotation manipulation for the touch pad unit 120.

With the haptic sensor 200 according to the embodiment, eight first distortion sensors 222 are disposed around the first column 212 in four directions, right direction (positive direction of the Y axis), left direction (negative direction of the Y axis), front direction (positive direction of the X axis), and back direction (negative direction of the X axis), the four directions matching the directions in which the four second columns 213 are disposed. Thus, when a rotation manipulation is performed for the touch pad unit 120, the haptic sensor 200 according to the embodiment can reliably sense distortion of the base 211, the distortion being generated in each of the four directions due to the tilt of each of the four second columns 213, with the first distortion sensors 222, each two of which are disposed in each direction. Therefore, the haptic sensor 200 can detect the rotation manipulation with high sensitivity.

With the haptic sensor 200 according to the embodiment, on the upper surface of the base 211 of the distortion generating body 210, the eight first distortion sensors 222 is disposed on the same circumference as the first circumference C1 passing through the four second columns 213, and each of the eight first distortion sensors 222 may be at a position matching a position on the outer edge of the relevant second column 213 in the Z-axis direction. Thus, when a rotation manipulation is performed for the touch pad unit 120 and each of the four second columns 213 thereby tilts in the rotational direction, the haptic sensor 200 according to the embodiment can detect, at the position, on the base 211 of the distortion generating body 210, at which the greatest distortion is generated, the position being on the same circumference as the first circumference C1 and matching a position on the outer edge of the relevant second column 213 in the Z-axis direction, the distortion with the relevant first distortion sensor 222. Therefore, the haptic sensor 200 can detect the rotation manipulation for the touch pad unit 120 with high sensitivity.

With the haptic sensor 200 according to the embodiment, the four second columns 213, which are part of the constituent elements used to detect a rotation manipulation for the touch pad unit 120, are disposed on the lower surface of the base 230A, and the eight first distortion sensors 222, which are also part of the constituent elements used to detect a rotation manipulation for the touch pad unit 120, are disposed on the upper surface of the base 230A. Thus, in the haptic sensor 200 according to the embodiment, the eight first distortion sensors 222 can be placed at preferable positions (specifically, on the same circumference as the first circumference C1 and at positions matching positions on the outer edges of the second columns 213 in the Z-axis direction), without interference with the second columns 213.

Therefore, the haptic sensor 200 can detect the rotation manipulation for the touch pad unit 120 with high sensitivity by use of the four second distortion sensors 233.

Layout of the Second Distortion Sensors 233

Figure 10:
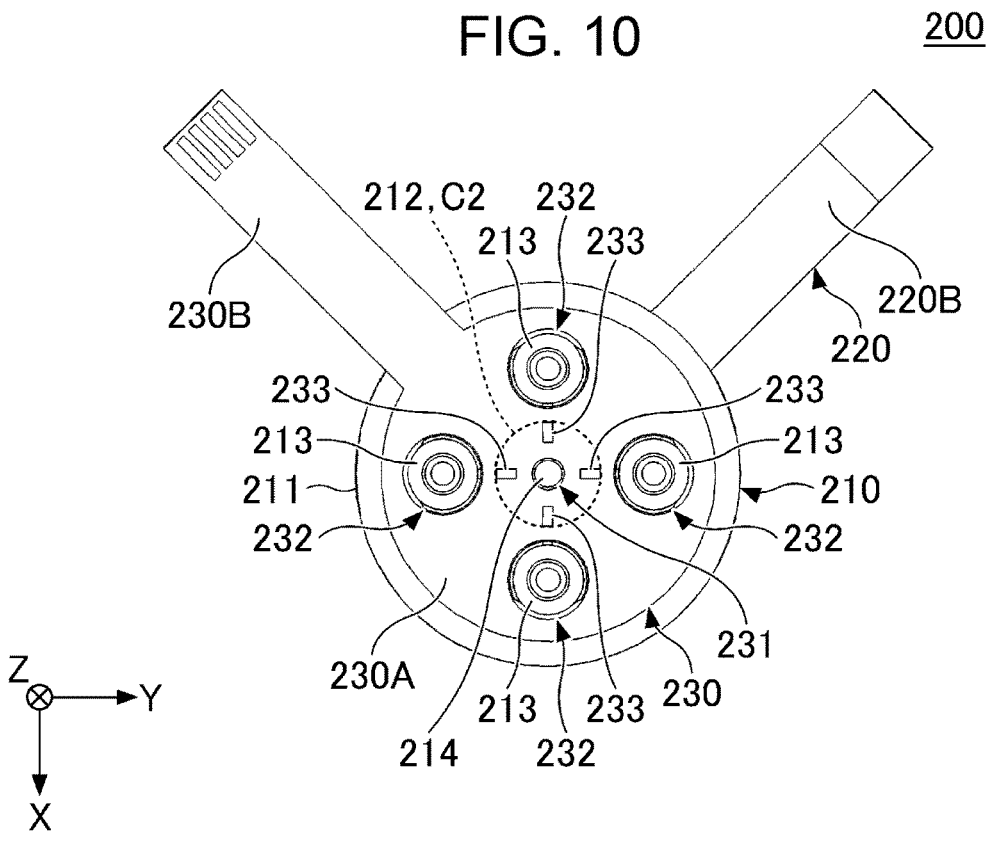
FIG. 10 is a bottom view of the haptic sensor according to the embodiment.

Next, the layout of the four second distortion sensors 233 in the haptic sensor 200 will be described with reference to FIG. 10. FIG. 10 is a bottom view of the haptic sensor 200 according to the embodiment.

As illustrated in FIG. 10, the haptic sensor 200 has one second distortion sensor 233 on the lower surface of the base 211 of the distortion generating body 210 in each of the four directions (right direction (positive direction of the Y axis), left direction (negative direction of the Y axis), front direction (positive direction of the X axis), and back direction (negative direction of the X axis)) with respect to the central protrusion 214. That is, the four second distortion sensors 233 are placed in a cross arrangement around the central protrusion 214. The second distortion sensor 233 in each direction is disposed between the central protrusion 214 and the relevant second column 213. In particular, the second distortion sensor 233 in each direction is disposed on the same circumference as a second circumference C2 formed by the outer edge of the root of the first column 212 disposed on the rear side (positive side of the Z axis). Thus, around the central protrusion 214, the four second distortion sensors 233 are disposed more inside than the four second columns 213 are and on the same circumference as the second circumference C2 formed by the outer edge of the root of the first column 212.

Each of the four second distortion sensors 233 is oriented so that the direction in which the first column 212 is tilted matches the detection direction. Thus, when a tilt manipulation is performed for the touch pad unit 120, the resistance of each of the four second distortion sensors 233 changes due to its expansion or contraction in the tilt direction of the first column 212, so the tilt manipulation can be detected.

The base 230A, in a circular ring shape enclosing the central protrusion 214, of the second flexible circuit board 230 is disposed on the lower surface of the base 211 of the distortion generating body 210. On the lower surface of the base 230A of the second flexible circuit board 230, the four second distortion sensors 233 are disposed on the same circumference as the second circumference C2 formed by the outer edge of the root of the first column 212 so as to enclose the central protrusion 214.

When a tilt manipulation is performed for the touch pad unit 120 and the base 211 (specifically, the periphery of the root of the first column 212) is thereby distorted through the first column 212, each of the four second distortion sensors 233 is deformed (expanded or contracted) according to the distortion of the base 211, so the resistance of each second distortion sensor 233 changes accordingly. Thus, each of the four second distortion sensors 233 can detect the distortion, caused by the tilt manipulation for the touch pad unit 120, of the base 211 and can thereby detect the tilt manipulation for the touch pad unit 120.

With the haptic sensor 200 according to the embodiment, four second distortion sensors 233 are disposed around the central protrusion 214 in four directions (right direction (positive direction of the Y axis), left direction (negative direction of the Y axis), front direction (positive direction of the X axis), and back direction (negative direction of the X axis)), the four directions matching the directions in which the touch pad unit 120 is tilted. Thus, when a tilt manipulation is performed for the touch pad unit 120 in any one of the four directions (right direction (positive direction of the Y axis), left direction (negative direction of the Y axis), front direction (positive direction of the X axis), and back direction (negative direction of the X axis)), the haptic sensor 200 according to the embodiment can reliably sense distortion of the base 211, the distortion being generated through the first column 212, with the second distortion sensor 233 disposed in the manipulation direction. Therefore, the haptic sensor 200 can detect the tilt manipulation with high sensitivity.

With the haptic sensor 200 according to the embodiment, on the lower surface of the base 211 of the distortion generating body 210, the four second distortion sensors 233 may be disposed on the same circumference as the second circumference C2 formed by the outer edge of the root of the first column 212. Thus, when a tilt manipulation is performed for the touch pad unit 120 and the first column 212 thereby tilts, the haptic sensor 200 according to the embodiment can detect, at the position, on the base 211 of the distortion generating body 210, at which the greatest distortion is generated, the position being on the same circumference as the second circumference C2, the distortion with the relevant second distortion sensor 233. Therefore, the haptic sensor 200 can detect the tilt manipulation for the touch pad unit 120 with high sensitivity.

With the haptic sensor 200 according to the embodiment, the first column 212, which is part of the constituent elements used to detect a tilt manipulation for the touch pad unit 120, is disposed on the upper surface of the base 230A, and the four second distortion sensors 233, which are also part of the constituent elements used to detect a tilt manipulation for the touch pad unit 120, are disposed on the lower surface of the base 230A. Thus, in the haptic sensor 200 according to the embodiment, the four second distortion sensors 233 can be placed at preferable positions (specifically, at positions matching positions on the outer edge of the first column 212 in the Z-axis direction), without interference with the first column 212. Therefore, the haptic sensor 200 can detect the tilt manipulation for the touch pad unit 120 with high sensitivity by use of the four second distortion sensors 233.

Structure of a Rotation Manipulation Detection Circuit 241

Figure 11:
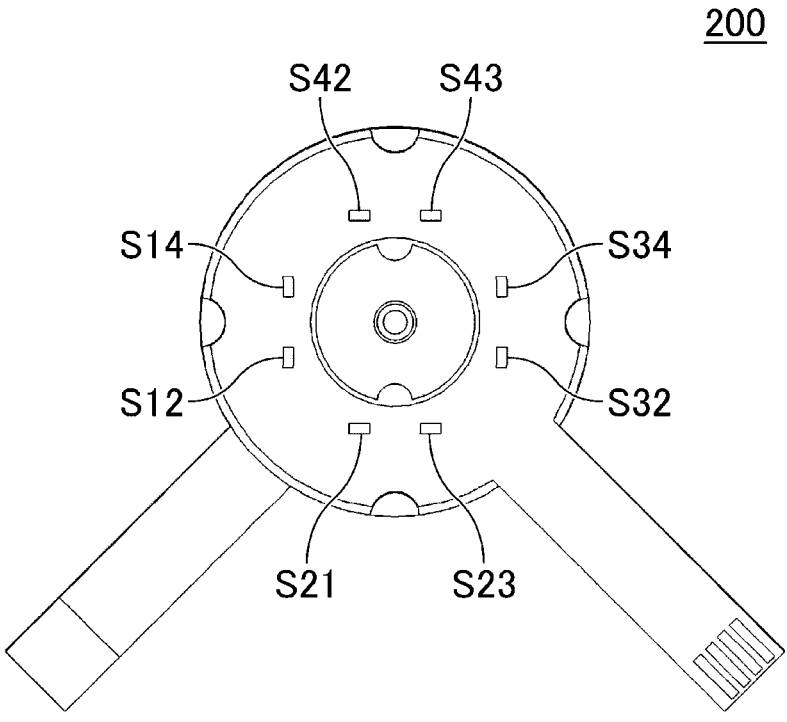
FIG. 11 illustrates the layout of eight first distortion sensors in the haptic sensor according to the embodiment.
Figure 11:
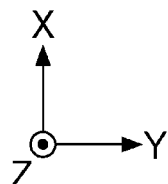
Figure 12:
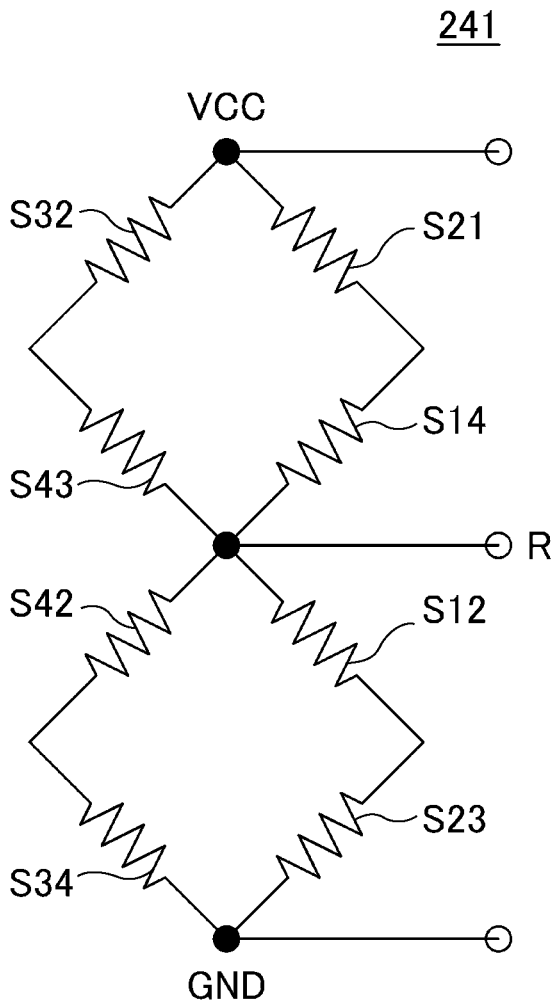
FIG. 12 is a circuit diagram of a rotation manipulation detection circuit included in the haptic sensor according to the embodiment.

Next, the structure of the rotation manipulation detection circuit 241 included in the haptic sensor 200 will be described with reference to FIGS. 11 and 12. FIG. 11 illustrates the layout of eight first distortion sensors 222 in the haptic sensor 200 according to the embodiment. FIG. 12 is a circuit diagram of the rotation manipulation detection circuit 241 included in the haptic sensor 200 according to the embodiment.

In FIGS. 11 and 12, the resistors denoted S42 and S43 refer to two of the eight first distortion sensors 222 included in the haptic sensor 200, the two first distortion sensors 222 being disposed on the positive side of the X axis.

In FIGS. 11 and 12, the resistors denoted S21 and S23 refer to two of the eight first distortion sensors 222 included in the haptic sensor 200, the two first distortion sensors 222 being disposed on the negative side of the X axis.

In FIGS. 11 and 12, the resistors denoted S32 and S34 refer to two of the eight first distortion sensors 222 included in the haptic sensor 200, the two first distortion sensors 222 being disposed on the positive side of the Y axis.

In FIGS. 11 and 12, the resistors denoted S12 and S14 refer to two of the eight first distortion sensors 222 included in the haptic sensor 200, the two first distortion sensors 222 being disposed on the negative side of the Y axis.

The rotation manipulation detection circuit 241 included in the haptic sensor 200 has two bridge circuits connected in series as illustrated in FIG. 12. Each bridge circuit is composed of four first distortion sensors 222.

One bridge circuit on the same side as a ground node GND is composed of four first distortion sensors 222 denoted S42, S34, S12, and S23, each of which is the top of a pair of first distortion sensors 222 in the counterclockwise direction with respect to the relevant second column 213 in the relevant direction of the four directions, when viewed from above (from the positive side of the Z axis).

The other bridge circuit on the same side as a power supply node VCC is composed of four first distortion sensors 222 denoted S43, S32, S14, and S21, each of which is the top of a pair of first distortion sensors 222 in the clockwise direction with respect to the relevant second column 213 in the relevant direction of the four directions, when viewed from above (from the positive side of the Z axis).

In the rotation manipulation detection circuit 241, therefore, when a rotation manipulation is performed for the touch pad unit 120 in the counterclockwise direction, all of the four first distortion sensors 222 denoted S42, S34, S12, and S23, each of which is the top of the relevant pair of first distortion sensors 222 in the counterclockwise direction, contract, so their resistances change in the negative direction. At the same time, all of the four first distortion sensors 222 denoted S43, S32, S14, and S21, each of which is the top of the relevant pair of first distortion sensors 222 in the clockwise direction, expand, so their resistances change in the positive direction. Thus, in the rotation manipulation detection circuit 241, a ratio between the combined resistance of one bridge circuit and the combined resistance of the other bridge circuit changes, so an output divided voltage R between the two bridge circuits changes. Therefore, the rotation manipulation detection circuit 241 can detect the rotation manipulation for the touch pad unit 120 in the counterclockwise direction according to the value of the output divided voltage R.

Conversely, in the rotation manipulation detection circuit 241, when a rotation manipulation is performed for the touch pad unit 120 in the clockwise direction, all of the four first distortion sensors 222 denoted S42, S34, S12, and S23, each of which is the top of the relevant pair of first distortion sensors 222 in the counterclockwise direction, expand, so their resistances change in the positive direction. At the same time, all of the four first distortion sensors 222 denoted S43, S32, S14, and S21, each of which is the top of the relevant pair of first distortion sensors 222 in the clockwise direction, contract, so their resistances change in the negative direction. Thus, in the rotation manipulation detection circuit 241, a ratio between the combined resistance of one bridge circuit and the combined resistance of the other bridge circuit changes, so the output divided voltage R between the two bridge circuits changes. Therefore, the rotation manipulation detection circuit 241 can detect the rotation manipulation for the touch pad unit 120 in the clockwise direction according to the value of the output divided voltage R.

Structure of a Tilt Manipulation Detection Circuit 242

Figures 13, 14:
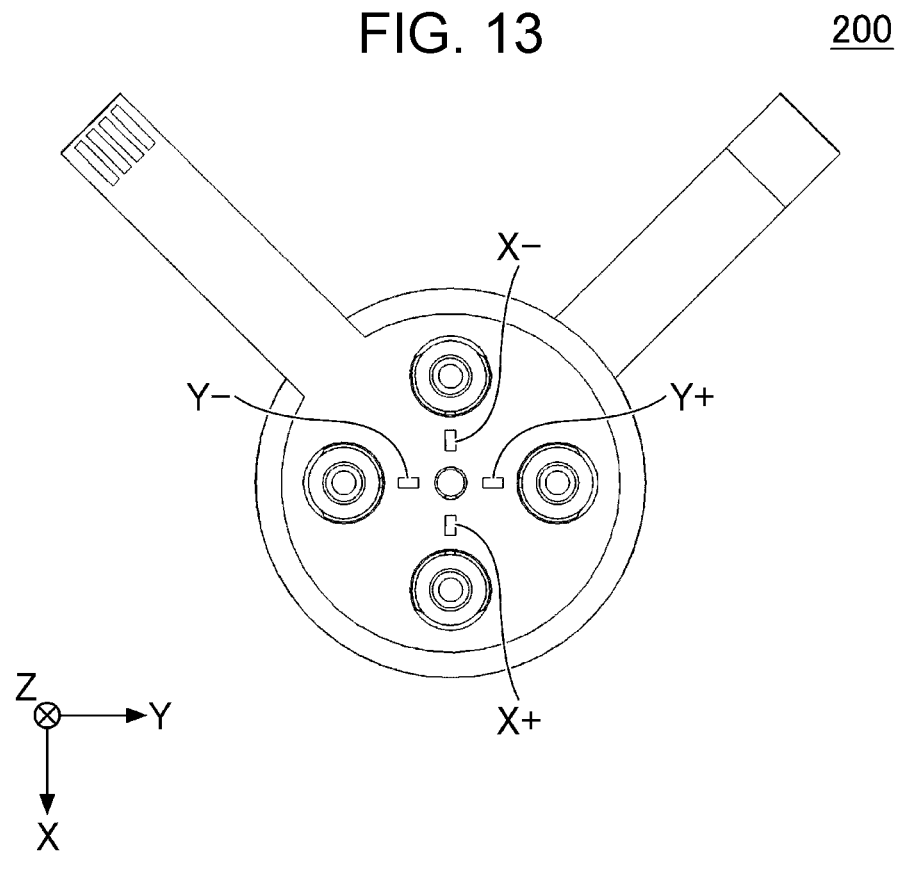
FIG. 13 illustrates the layout of four second distortion sensors in the haptic sensor according to the embodiment.
FIG. 14 is a circuit diagram of a tilt manipulation detection circuit included in the haptic sensor according to the embodiment.

Next, the structure of the tilt manipulation detection circuit 242 included in the haptic sensor 200 will be described with reference to FIGS. 13 and 14. FIG. 13 illustrates the layout of four second distortion sensors 233 in the haptic sensor 200 according to the embodiment. FIG. 14 is a circuit diagram of the tilt manipulation detection circuit 242 included in the haptic sensor 200 according to the embodiment.

In FIGS. 13 and 14, the resistor denoted X+ refers to one of the four second distortion sensors 233 included in the haptic sensor 200, the one being a second distortion sensor 233 (X+) disposed on the positive side of the X axis.

In FIGS. 13 and 14, the resistor denoted X− refers to one of the four second distortion sensors 233 included in the haptic sensor 200, the one being a second distortion sensor 233 (X−) disposed on the negative side of the X axis.

In FIGS. 13 and 14, the resistor denoted Y+ refers to one of the four second distortion sensors 233 included in the haptic sensor 200, the one being a second distortion sensor 233 (Y+) disposed on the positive side of the Y axis.

In FIGS. 13 and 14, the resistor denoted Y− refers to one of the four second distortion sensors 233 included in the haptic sensor 200, the one being a second distortion sensor 233 (Y−) disposed on the negative side of the Y axis.

The tilt manipulation detection circuit 242 included in the haptic sensor 200 has a bridge circuit composed of four second distortion sensors 233, as illustrated in FIG. 14.

Specifically, in the tilt manipulation detection circuit 242, the second distortion sensor 233 (X+) and second distortion sensor 233 (X−) are connected in series. When the first column 212 is tilted in the X-axis direction, the resistances of the two second distortion sensors 233 change in opposite directions, positive direction and negative direction. Thus, in the tilt manipulation detection circuit 242, the ratio of the two second distortion sensors 233 changes in response to the tilt of the first column 212 in the X-axis direction, so a voltage value at an intermediate point X between the two second distortion sensors 233 changes. Therefore, the tilt manipulation detection circuit 242 can detect the side (positive side or negative side) toward which the touch pad unit 120 is tilted in the X-axis direction as well as the angle of the tilt, according to the voltage value at the intermediate point X.

In the tilt manipulation detection circuit 242, the second distortion sensor 233 (Y+) and second distortion sensor 233 (Y−) are connected in series. When the first column 212 is tilted in the Y-axis direction, the resistances of the two second distortion sensors 233 change in opposite directions, positive direction and negative direction. Thus, in the tilt manipulation detection circuit 242, the ratio of the two second distortion sensors 233 changes in response to the tilt of the first column 212 in the Y-axis direction, so a voltage value at an intermediate point Y between the two second distortion sensors 233 changes. Therefore, the tilt manipulation detection circuit 242 can detect the side (positive side or negative side) toward which the touch pad unit 120 is tilted in the Y-axis direction as well as the angle of the tilt, according to the voltage value at the intermediate point Y.

With the controller 100 in this embodiment, a tilt manipulation for the touch pad unit 120 in the X-axis direction and a tilt manipulation for the touch pad unit 120 in the Y-axis direction can be concurrently performed. In this case, in the tilt manipulation detection circuit 242, the voltage value at the intermediate point X changes in response to the tilt of the first column 212 in the X-axis direction. At the same time, the voltage value at the intermediate point Y changes in response to the tilt of the first column 212 in the Y-axis direction. Therefore, the tilt manipulation detection circuit 242 can detect both the tilt manipulation (tilt direction and load) for the touch pad unit 120 in the X-axis direction and the tilt manipulation (tilt direction and load) for the touch pad unit 120 in the Y-axis direction, which are concurrently performed, in response to the voltage value at the intermediate point X and to the voltage value at the intermediate point Y.

With the tilt manipulation detection circuit 242, when the first column 212 is pressed downward (in the negative direction of the Z axis), the resistances of the four second distortion sensors 233 equally change. Thus, with the tilt manipulation detection circuit 242, a divided voltage Zout between a bridge circuit composed of four second distortion sensors 233 and a resistor (not illustrated) connected in series with the bridge circuit changes according to an amount by which the first column 212 is pressed downward (in the negative direction of the Z axis). Therefore, the tilt manipulation detection circuit 242 can detect the amount by which the touch pad unit 120 is pressed downward (in the negative direction of the Z axis), according to the value of the divided voltage Zout.

Variation of the Non-Slip Portion 120C

Figure 15:
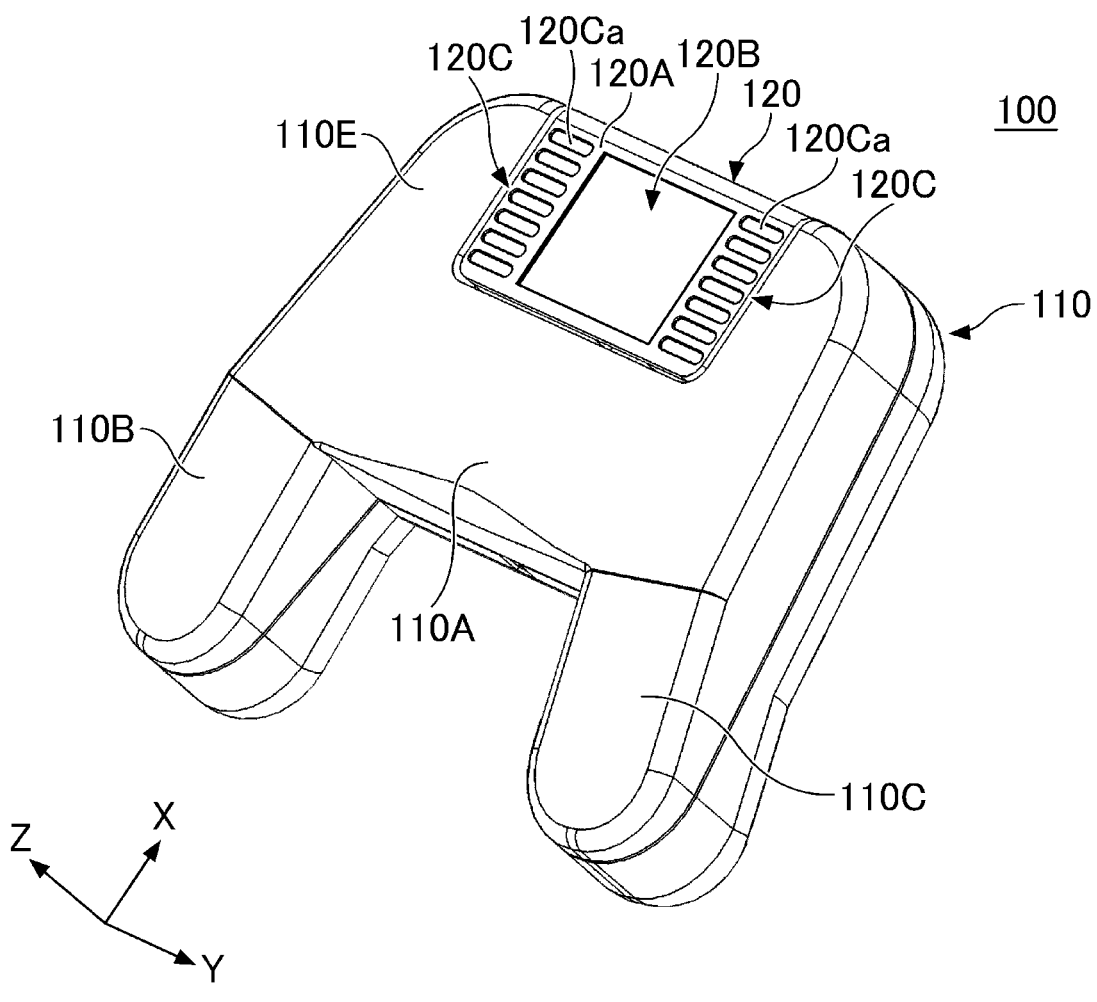
FIG. 15 illustrates a variation of a non-slip portion included in the haptic sensor according to the embodiment.
Figure 16:
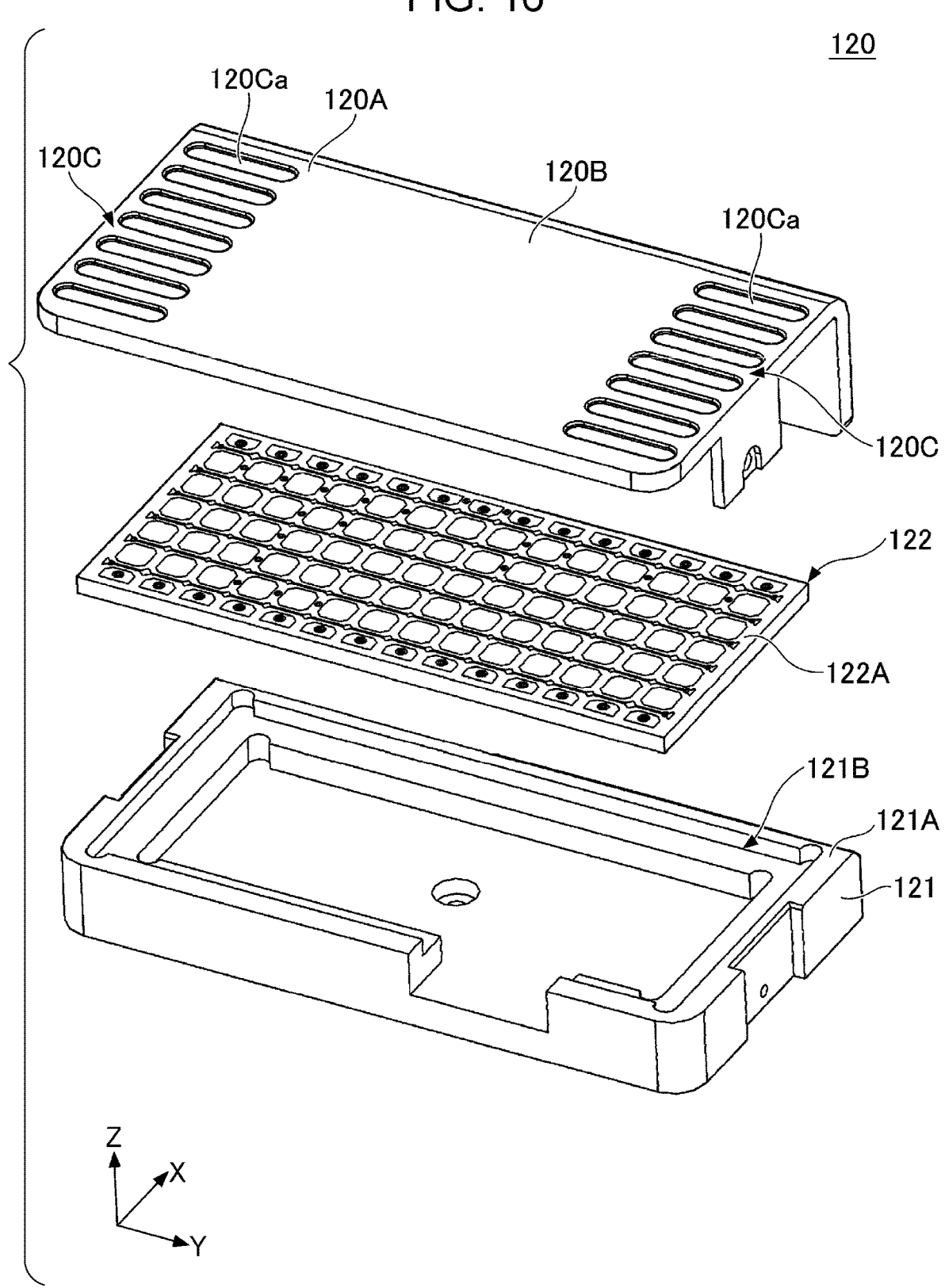
FIG. 16 is an exploded perspective view of a touch pad unit included in the controller in FIG. 15.

FIG. 15 illustrates a variation of the non-slip portion 120C included in the haptic sensor 100 according to the embodiment. FIG. 16 is an exploded perspective view of the touch pad unit 120 included in the controller 100 in FIG. 15.

In an example illustrated in FIGS. 15 and 16, each of non-slip portions 120C paired in the left-right direction is a row of a plurality of grooves 120Ca, each of which is along the left-right direction (Y-axis direction). The plurality of grooves 120Ca in each row are arranged in the front-back direction (X-axis direction). In the example in FIGS. 15 and 16, each of the plurality of grooves 120Ca is shaped so as to be recessed downward (negative direction of the Z axis) from the upper surface 120A and to be oblong with the left-right direction (Y-axis direction) taken as the longitudinal direction.

Since each of the plurality of grooves 120Ca is shaped so as to be recessed and to be oblong as described above, the controller 100 in the embodiment can enhance the non-slip effect in the front-back direction (X-axis direction) for the thumb of the manipulator. Since the plurality of grooves 120Ca in each row are arranged in the front-back direction (X-axis direction), the controller 100 in the embodiment can provide the non-slip effect for the thumb of the manipulator in a wide range in the front-back direction (X-axis direction).

In the example in FIGS. 15 and 16, sensor electrodes of the touch pad 122 are also provided at positions matching the positions of non-slip portions 120C in the Z-axis direction. That is, non-slip portions 120C paired in the left-right direction are provided on the touch pad 122. Thus, with the controller 100 in the embodiment, the entire upper surface of the touch pad unit 120 including the non-slip portions 120C paired in the left-right direction can be effectively used as a touch manipulation area and the position of the finger can be detected in a wide range.

Effects

As described above, the haptic sensor 200 in the embodiment has the distortion generating body 210, first distortion sensors 222 for detecting a rotation manipulation, and second distortion sensors 233 for detecting a tilt manipulation. The distortion generating body 210 has the base 211 in a plate-like shape, the first column 212 disposed on one surface of the base 211, and a plurality of second columns 213 disposed on a single circumference, the center of which is the first column 212, on another surface of the base 211. On the base 211 of the distortion generating body 210, the first distortion sensors 222 are placed on a circumference shared between the first distortion sensors 222 and the plurality of second columns 213. On the base 211 of the distortion generating body 210, the second distortion sensors 233 are placed around the first column 212.

Thus, with the haptic sensor 200 in the embodiment, a structure for detecting a rotation manipulation (that is, second columns 213 and first distortion sensors 222) and a structure for detecting a tilt manipulation (that is, first column 212 and second distortion sensor 233) can be separated, so these structures can be individually made appropriate with ease.

The haptic sensor 200 in the embodiment can detect a rotation manipulation on the rear side of the second columns 213 by use of the first distortion sensors 222 and can also detect a tilt manipulation on the rear side of the first column 212 by use of the second distortion sensors 233, so the first distortion sensors 222 and second distortion sensors 233 can be easily placed at preferable positions at which the distortion generating body 210 is likely to be distorted. Therefore, the haptic sensor 200 can detect the rotation manipulation and tilt manipulation with high sensitivity.

With the haptic sensor 200 in the embodiment, since first column 212 is disposed on one surface of the base 211 and the second columns 213 are disposed on another surface of the base 211, the first column 212 and second columns 213 can be easily placed at preferable positions so that they do not interfere with each other. Therefore, the haptic sensor 200 can detect the rotation manipulation and tilt manipulation with high sensitivity.

With the haptic sensor 200 in the embodiment, at least the first column 212 and second columns 213 are provided integrally with the distortion generating body 210. Therefore, the haptic sensor 200 only needs a relatively small number of parts to detect the rotation manipulation and tilt manipulation with high sensitivity.

With the haptic sensor 200 in the embodiment, the first column 212 and second column 213 may be columnar.

Thus, the haptic sensor 200 in the embodiment can cause the distortion generating body 210 to be distorted in a similar manner in all manipulation directions, so variations in values detected by the first distortion sensor 222 and second distortion sensors 233 can be suppressed. Therefore, the haptic sensor 200 can detect the rotation manipulation and tilt manipulation with high sensitivity.

With the haptic sensor 200 in the embodiment, on one surface of the base 211 of the distortion generating body 210, each of the first distortion sensors 222 may be disposed at a position matching a position on the outer edges of the relevant second column 213 in the Z-axis direction. On another surface of the base 211 of the distortion generating body 210, the second distortion sensors 233 may be disposed at positions matching positions on the outer edge of the first column 212 in the Z-axis direction.

Thus, the haptic sensor 200 according to the embodiment can detect distortion during a rotation manipulation and distortion during a tilt manipulation at the position at which the greatest distortion is generated. Therefore, the haptic sensor 200 can detect the rotation manipulation and tilt manipulation with high sensitivity.

With the haptic sensor 200 in the embodiment, the distortion generating body 210 may have four second columns 213 disposed in four directions, which may be equally spaced at intervals of 90 degrees with respect to the first column 212.

Thus, the haptic sensor 200 in the embodiment can easily generate distortion during a tilt manipulation in four directions, with respect to the first column 212, in which four second columns 213 are disposed. Therefore, when second distortion sensors 233 are placed in the four directions, the haptic sensor 200 can detect the tilt manipulation with high sensitivity.

With the haptic sensor 200 in the embodiment, the distortion generating body 210 may have four first through-holes 215 formed around the first column 212 on the base 211. Each of the four first through-holes 215 may be formed in a direction between two adjacent second columns 213, the direction being one of four directions equally spaced at intervals of 90 degrees with respect to the first column 212.

Thus, the haptic sensor 200 in the embodiment can detect the tilt manipulation with high sensitivity.

With the haptic sensor 200 in the embodiment, the distortion generating body 210 may have four second through-holes 216 formed on the same side of the four second columns 213 on the base 211 as the outer circumference of the base 211, and may also have four engaging protrusions 217 disposed on the same side of the four second through-holes 216 in the base 211 as the outer circumference of the base 211. The first distortion sensors 222 may be disposed on the first flexible circuit board 220 placed on one surface of the base 211 of the distortion generating body 210. The first flexible circuit board 220 may have four engaging portions 223 engaging the four engaging protrusions 217.

Thus, since the haptic sensor 200 in the embodiment has four second through-holes 216, the haptic sensor 200 can easily generate distortion in each of the four second columns 213 during a rotation manipulation and can thereby detect the rotation manipulation with high sensitivity and high precision. With the haptic sensor 200 in the embodiment, the first distortion sensors 222 are disposed on the first flexible circuit board 220, so the first distortion sensors 222 can be easily placed on the base 211 of the distortion generating body 210.

With the haptic sensor 200 in the embodiment, the second distortion sensors 233 may be disposed on the second flexible circuit board 230 placed on another surface of the base 211 of the distortion generating body 210, and the second flexible circuit board 230 may have four peripheral openings 232 into which the four second columns 213 are inserted.

Thus, with the haptic sensor 200 in the embodiment, since the second distortion sensors 233 are disposed on the second flexible circuit board 230, the second distortion sensors 233 can be easily placed on the base 211 of the distortion generating body 210.

The controller 100 in the embodiment may have the case 110, the haptic sensor 200 disposed in the interior of the case 110, the manipulation plate 124 disposed in the interior of the case 110 and fixed to the top of the first column 212 included in the distortion generating body 210 in the haptic sensor 200, and stoppers 124B, disposed in the interior of the case 110, which restrict an amount by which the manipulation plate 124 is displaced.

Thus, since stoppers 124B are disposed, the controller 100 in the embodiment can restrict an amount by which the manipulation plate 124 is displaced during a tilt manipulation. Therefore, the controller 100 can suppress damage to the distortion generating body 210 due to its excessive deformation.

With the controller 100 in the embodiment, the manipulation plate 124 may have a rectangular shape and the stoppers 124B may be disposed at both ends of the manipulation plate 124 in the longitudinal direction, one at each end.

Thus, when the manipulation plate 124 is tilted in its longitudinal direction, the controller 100 in the embodiment can effectively restrict the tilt of the manipulation plate 124 in the longitudinal direction with the stoppers 124B.

The controller 100 in the embodiment may have the touch pad unit 120 disposed on the manipulation plate 124.

Thus, the controller 100 in the embodiment enables a tilt manipulation and a rotation manipulation for the touch pad unit 120 and can detect the tilt manipulation and rotation manipulation for the touch pad unit 120 with high sensitivity.

In the controller 100 in the embodiment, the touch pad unit 120 may be disposed in the recess 110D in the case 110, the upper surface 120A of the touch pad unit 120 and the upper surface 110E of the case 110 may be flush with each other, and clearances may be formed between the outer circumferential surfaces of the touch pad unit 120 and the inner circumferential surfaces of the recess 110D in the case 110.

Thus, with the controller 100 in the embodiment, since an outer circumferential surface of the touch pad unit 120 abuts an inner circumferential surface of the recess 110D in the case 110, the controller 100 can restricts the rotation of the touch pad unit 120 during a rotation manipulation. Therefore, an angle by which the touch pad unit 120 can rotate during a rotation manipulation for it can be adjusted by adjusting the width of the clearance, so the controller 100 in the embodiment can suppress damage to the distortion generating body 210 due to its excessive deformation.

The controller 100 in the embodiment may have the substrate 140 disposed in the interior of the case 110. Four recesses 142 may be formed in the substrate 140. One second column 213 may be inserted into each recess 142.

The central protrusion 214 may be disposed at the center of the other surface of the base 211. A clearance may be formed between the substrate 140 and the central protrusion 214.

Thus, since the central protrusion 214 abuts the substrate 140, the controller 100 in the embodiment can restrict the deformation of the touch pad unit 120 during a pressing manipulation for the touch pad unit 120. Therefore, when the width of the clearance is adjusted, the controller 100 in the embodiment can suppress damage to the distortion generating body 210 due to its excessive deformation.

The controller 100 in the embodiment has the case 110, the touch pad unit 120 (manipulation unit), in a plate-like shape, disposed in the case 110 so as to be exposed from the case 110, and the haptic sensor 200 that detects a rotation manipulation for the touch pad unit 120. The haptic sensor 200 has the distortion generating body 210 connected to the touch pad unit 120 and also has second distortion sensors 233 (distortion sensors) disposed on the distortion generating body 210. The touch pad unit 120 has non-slip portions 120C, which are paired in the left-right direction, in the vicinity of both ends of the upper surface 120A of the touch pad unit 120 in the left-right direction.

Thus, with the controller 100 in the embodiment, when the thumbs of both hands of the manipulator are retained by the non-slip portions 120C paired in the left-right direction, the manipulator can easily perform a rotation manipulation by which a force (twist load) is applied to the touch pad unit 120 in the rotational direction. In addition, the haptic sensor 200 can detect the rotation manipulation with the second distortion sensors 233.

With the controller 100 in the embodiment, the non-slip portion 120C is a protrusion formed integrally with the touch pad unit 120.

Thus, with the controller 100 in the embodiment, the manipulator can easily retain the thumbs of both hands on the non-slip portions 120C paired in the left-right direction. In addition, the manipulator can intuitively locate positions at which to place the thumbs of both hands with ease.

With the controller 100 in the embodiment, the touch pad unit 120 (manipulation unit) has the touch pad 122 of capacitive type. The touch pad 122 is disposed between the non-slip portions 120C paired in the left-right direction.

Thus, with the controller 100 in the embodiment, a touch manipulation for the touch pad 122 can be performed besides a rotation manipulation for the touch pad unit 120. That is, various manipulations can be performed. Space between the non-slip portions 120C paired in the left-right direction can be effectively used as a touch manipulation area.

With the controller 100 in the embodiment, each non-slip portion 120C is a row of a plurality of grooves 120Ca disposed on the touch pad unit 120 (manipulation unit). Each of the plurality of grooves 120Ca is along the left-right direction. The plurality of grooves 120Ca in each row are arranged in the front-back direction.

Thus, with the controller 100 in the embodiment, the manipulator can easily retain the thumbs of both hands on the non-slip portions 120C paired in the left-right direction. In addition, the manipulator can intuitively locate positions at which to place the thumbs of both hands with ease.

With the controller 100 in the embodiment, the touch pad unit 120 has the touch pad 122 of capacitive type. The non-slip portions 120C paired in the left-right direction are disposed on the touch pad 122.

Thus, with the controller 100 in the embodiment, a touch manipulation for the touch pad 122 can be performed besides a rotation manipulation for the touch pad unit 120.

That is, various manipulations can be performed. The entire upper surface of the touch pad unit 120 including the non-slip portions 120C paired in the left-right direction can be effectively used as a touch manipulation area.

With the controller 100 in the embodiment, the touch pad unit 120 is disposed in the recess 110D in the case 110. One side surface 120D of the touch pad unit 120 is flush with one side surface 110G of the case 110.

Thus, with the controller 100 in the embodiment, it is possible to prevent the case 110 from interfering with a rotation manipulation for the touch pad unit 120 without having to form a clearance at the front of the touch pad unit 120. Therefore, the controller 100 can be downsized.

With the controller 100 in the embodiment, the haptic sensor 200 can concurrently detect a tilt manipulation for the touch pad unit 120 in the front-back direction and a tilt manipulation for the touch pad unit 120 in the left-right direction.

Thus, with the controller 100 in the embodiment, a single haptic sensor 200 suffices to concurrently detect a tilt manipulation for the touch pad unit 120 in the front-back direction and a tilt manipulation for the touch pad unit 120 in the left-right direction.

The controller 100 in the embodiment has the substrate 140 that is disposed below the haptic sensor 200 and to which the haptic sensor 200 is fixed, and also has the push switch 141 disposed below the substrate 140.

Thus, with the controller 100 in the embodiment, a pressing manipulation for the touch pad unit 120 can be performed besides a touch manipulation and rotation manipulation for the touch pad unit 120. That is, various manipulations can be performed.

This completes the detailed description of embodiments of the present invention. However, the present invention is not limited to the embodiments. Various variations and modifications are possible without departing from the intended scope, described in the claims, of the present invention.

What is claimed is:

1. A controller comprising:
a case;
a manipulation unit, in a plate-like shape, disposed in the case so as to be exposed from the case; and
a haptic sensor that detects a rotation manipulation for the manipulation unit; wherein
the haptic sensor has
a distortion generating body fixed to the manipulation unit, and
a distortion sensor disposed on the distortion generating body, and
the manipulation unit has non-slip portions, which are paired in a left-right direction, near both ends of an upper surface of the manipulation unit in the left-right direction.

2. The controller according to claim 1, wherein each of the non-slip portions is a protrusion formed integrally with the manipulation unit.

3. The controller according to claim 2, wherein:
the manipulation unit has a touch pad of capacitive type; and
the touch pad is disposed between the non-slip portions paired in the left-right direction.

4. The controller according to claim 2, wherein:
the manipulation unit is disposed in the recess in the case; and
one side surface of the manipulation unit is flush with one side surface of the case.

5. The controller according to claim 4, wherein the haptic sensor concurrently detects a tilt manipulation for the manipulation unit in a front-back direction and a tilt manipulation for the manipulation unit in the left-right direction.

6. The controller according to claim 5, further comprising:
a substrate that is disposed below the haptic sensor and to which the haptic sensor is fixed; and
a push switch disposed below the substrate.

7. The controller according to claim 1, wherein:
each of the non-slip portions is a row of a plurality of grooves formed in the manipulation unit;
each of the plurality of grooves is along the left-right direction; and
the plurality of grooves in each row are arranged in a front-back direction.

8. The controller according to claim 7, wherein:
the manipulation unit has a touch pad of capacitive type; and
the non-slip portions are disposed on the touch pad.

* * * * *